(12) United States Patent
Bassett

(10) Patent No.: US 9,144,187 B2
(45) Date of Patent: Sep. 29, 2015

(54) AGRICULTURAL APPARATUS WITH HYDRAULIC CYLINDER AND MANIFOLD FOR A ROW UNIT

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 90 days.

(21) Appl. No.: 13/952,276

(22) Filed: Jul. 26, 2013

(65) Prior Publication Data

US 2013/0306337 A1 Nov. 21, 2013

Related U.S. Application Data

(63) Continuation of application No. 13/758,979, filed on Feb. 4, 2013, which is a continuation-in-part of (Continued)

(51) Int. Cl.
*A01B 61/04* (2006.01)
*A01B 63/111* (2006.01)
(Continued)

(52) U.S. Cl.
CPC .............. *A01B 61/044* (2013.01); *A01B 63/111* (2013.01); *A01C 7/205* (2013.01); *A01C 21/005* (2013.01)

(58) Field of Classification Search
CPC .... A01B 63/114; A01B 63/111; A01B 63/10; A01B 63/02; A01B 63/00; A01B 63/32; A01B 63/24; A01B 63/22; A01B 63/16; A01B 63/008; A01B 61/044; A01B 61/04; A01B 61/00; A01B 33/087; A01B 33/08; A01B 33/00; A01B 33/024; A01B 79/005; A01B 79/02; A01C 7/203; A01C 7/205; A01C 7/201; A01C 7/20; A01C 7/208; A01C 7/00; A01C 21/005; A01C 21/00; E02F 9/2029; E02F 9/2033; E02F 9/2037; E02F 9/2025; E02F 9/20; E02F 9/00; E02F 9/2271; E02F 9/2264; E02F 9/2257; E02F 9/2221; E02F 9/2217; E02F 9/2207; E02F 9/2203; E02F 9/22; E02F 5/027; E02F 5/02; E02F 5/00
USPC ...................... 172/4, 2, 413; 701/50; 111/135, 111/139–143, 157, 163–169, 190–196, 200, 111/900, 927
See application file for complete search history.

(56) References Cited

U.S. PATENT DOCUMENTS

| 114,002 A | 4/1871 | Godfrey |
| 353,491 A | 2/1886 | Wells |

(Continued)

FOREIGN PATENT DOCUMENTS

| BE | 551372 | 10/1956 |
| CA | 530673 | 9/1956 |

(Continued)

OTHER PUBLICATIONS

John Deere, Seat Catalog, date estimated as early Sep. 2011 (19 pages).

(Continued)

*Primary Examiner* — Christopher J Novosad
(74) *Attorney, Agent, or Firm* — Nixon Peabody LLP

(57) ABSTRACT

An agricultural row unit includes an attachment frame adapted to be rigidly connected to a towing frame. A linkage assembly is pivotably coupled to the attachment frame to permit vertical pivoting movement of the linkage assembly relative to the attachment frame. A hydraulic cylinder is coupled to the linkage assembly for urging the linkage assembly downwardly toward the soil. A hose connection manifold is mounted adjacent to the hydraulic cylinder for circulating hydraulic fluid between a hydraulic source and the hydraulic cylinder. The hose connection manifold has a plurality of ports including an inlet port, an outlet port, and a valve port, the inlet port being adapted to receive an inlet hose, the outlet port being adapted to receive an outlet hose, and the valve port being adapted to receive an end of a hydraulic control valve.

18 Claims, 32 Drawing Sheets

Related U.S. Application Data application No. 13/561,934, filed on Jul. 30, 2012, now Pat. No. 8,776,702, which is a continuation-in-part of application No. 13/075,574, filed on Mar. 30, 2011, now Pat. No. 8,544,398, which is a continuation-in-part of application No. 12/882,627, filed on Sep. 15, 2010, now Pat. No. 8,544,397.

(51) Int. Cl.
*A01C 7/20* (2006.01)
*A01C 21/00* (2006.01)

(56) References Cited

U.S. PATENT DOCUMENTS

| | | | |
|---|---|---|---|
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,269,051 A | 1/1942 | Cahoy | |
| 2,341,143 A | 2/1944 | Herr | |
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |

(56) References Cited

U.S. PATENT DOCUMENTS

| | | | |
|---|---|---|---|
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | 111/137 |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,136,934 A | 8/1992 | Darby, Jr. | 100/125 |
| 5,190,112 A | 3/1993 | Johnston et al. | 172/245 |
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/311 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,682 A | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/191 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,524,525 A | 6/1996 | Nikkel et al. | 91/179 |
| 5,531,171 A | 7/1996 | Whitesel et al. | 111/121 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoke et al. | 111/121 |
| 6,701,857 B1 | 3/2004 | Jensen et al. | 111/200 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,886,650 B2 | 5/2005 | Bremmer | 180/89.13 |
| 6,889,943 B2 | 5/2005 | Dinh et al. | 248/34 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 7,938,074 B2 | 5/2011 | Liu | 111/200 |
| 7,946,231 B2 | 5/2011 | Martin et al. | 111/60 |
| 8,146,519 B2 | 4/2012 | Bassett | 111/119 |
| 8,151,717 B2 | 4/2012 | Bassett | 111/135 |
| 8,327,780 B2 | 12/2012 | Bassett | 111/119 |
| 8,359,988 B2 | 1/2013 | Bassett | 111/135 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 | 4/2013 | Rylander | 111/140 |
| 8,550,020 B2 | 10/2013 | Sauder et al. | 111/200 |
| 8,573,319 B1 | 11/2013 | Casper et al. | 172/4 |
| 8,634,992 B2 | 1/2014 | Sauder et al. | 701/50 |
| 2002/0162492 A1 | 11/2002 | Juptner | 111/140 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |

(56) References Cited

U.S. PATENT DOCUMENTS

| | | | |
|---|---|---|---|
| 2007/0044694 A1 | 3/2007 | Martin | 111/121 |
| 2007/0272134 A1 | 11/2007 | Baker et al. | 111/163 |
| 2008/0093093 A1 | 4/2008 | Sheppard et al. | 172/2 |
| 2008/0236461 A1 | 10/2008 | Sauder et al. | 111/170 |
| 2008/0256916 A1 | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2011/0247537 A1 | 10/2011 | Freed | 111/140 |
| 2011/0313575 A1 | 12/2011 | Kowalchuk et al. | 700/282 |
| 2012/0060730 A1 | 3/2012 | Bassett | 111/149 |
| 2012/0060731 A1 | 3/2012 | Bassett | 111/149 |
| 2012/0167809 A1 | 7/2012 | Bassett | 111/119 |
| 2012/0186216 A1 | 7/2012 | Vaske et al. | 56/367 |
| 2012/0210920 A1 | 8/2012 | Bassett | 111/140 |
| 2012/0216731 A1 | 8/2012 | Schilling et al. | 111/69 |
| 2012/0232691 A1 | 9/2012 | Green et al. | 700/231 |
| 2012/0255475 A1 | 10/2012 | Mariman et al. | 111/149 |
| 2012/0305274 A1 | 12/2012 | Bassett | 172/5 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2013/0146318 A1 | 6/2013 | Bassett | 172/5 |
| 2014/0026748 A1 | 1/2014 | Stoller et al. | 91/418 |
| 2014/0034339 A1 | 2/2014 | Sauder et al. | 172/2 |
| 2014/0034343 A1 | 2/2014 | Sauder et al. | 172/664 |

FOREIGN PATENT DOCUMENTS

| | | | |
|---|---|---|---|
| DE | 335464 | 9/1921 | |
| DE | 1108971 | 6/1961 | |
| DE | 24 02 411 | 7/1975 | E01C 23/08 |
| EP | 2 497 348 A1 | 9/2012 | A01B 79/00 |
| GB | 1 574 412 | 9/1980 | 111/123 |
| GB | 2 056 238 A | 10/1982 | |
| JP | 54-57726 | 5/1979 | 74/529 |
| SU | 392897 | 8/1973 | |
| SU | 436778 | 7/1974 | |
| SU | 611201 | 6/1978 | 74/527 |
| SU | 625648 | 9/1978 | |
| SU | 1410884 A1 | 7/1988 | |
| SU | 1466674 | 3/1989 | 111/124 |
| WO | WO 2011/161140 A1 | 12/2011 | A01C 7/20 |
| WO | WO 2012/149367 A1 | 1/2012 | A01C 5/00 |
| WO | WO 2012/149415 A1 | 1/2012 | A01B 63/111 |
| WO | WO 2012/167244 A1 | 12/2012 | A01B 5/00 |
| WO | WO 2013/025898 A1 | 2/2013 | B60C 23/02 |

OTHER PUBLICATIONS

Vogt, Willie, "*Revisiting Robotics*," http://m.farmindustrynews.com/farm-equipment/revisiting-robotics, Dec. 19, 2013 (3 pages).

John Deere, New Semi-Active Sea Suspension, http://www.deere.com/en_US/parts/agparts/semiactiveseat.html, date estimated as early as Jan. 2014, retrieved Feb. 6, 2014 (2 pages).

Case Corporation Brochure, Planters 900 Series Units/Modules Product Information, Aug. 1986 (4 pages).

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application*," Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields*," Top Producer, A Farm Journal Publication, Nov. 1991, pp. 12-14 (4 pages).

Borgelt, Steven C., "*Sensor Technologies and Control Strategies for Managing Variability*," University of Missouri, Apr. 14-16, 1992 (15 pages).

Buffalo Farm Equipment Catalog on Models 4600, 4630, 4640, and 4620, date estimated as early as Feb. 1992 (4 pages).

Hiniker 5000 Cultivator Brochure, date estimated as early as Feb. 1992 (4 pages).

Hiniker Series 5000 Row Cultivator Rigid and Folding Toolbar Operator's Manual, date estimated as early as Feb. 1992 (5 pages).

Orthman Manufacturing, Inc., Rowcrop Cultivator Booklet, date estimated as early as Feb. 1992 (4 pages).

Yetter Catalog, date estimated as early as Feb. 1992 (4 pages).

Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, Retrieved Nov. 2, 2012 (4 pages).

Finck, Charlene, "*Listen to Your Soil*," Farm Journal Article, Jan. 1993, pp. 14-15 (2 pages).

Acu-Grain, "*Combine Yield Monitor 99% Accurate? 'You Bet Your Bushels!!*'" date estimated as early as Feb. 1993 (2 pages).

John Deere, New 4435 Hydro Row-Crop and Small-Grain Combine, date estimated as early as Feb. 1993 (8 pages).

Vansichen, R. et al., "Continuous Wheat Yield Measurement on a Combine," date estimated as early as Feb. 1993 (5 pages).

Yetter 2010 Product Catalog, date estimated as early as Jan. 2010 (2 pages).

Yetter Cut and Move Manual, Sep. 2010 (28 pages).

Martin Industries, LLC Paired 13" Spading Closing Wheels Brochure, date estimated as early as Jun. 6, 2012, pp. 18-25 (8 pages).

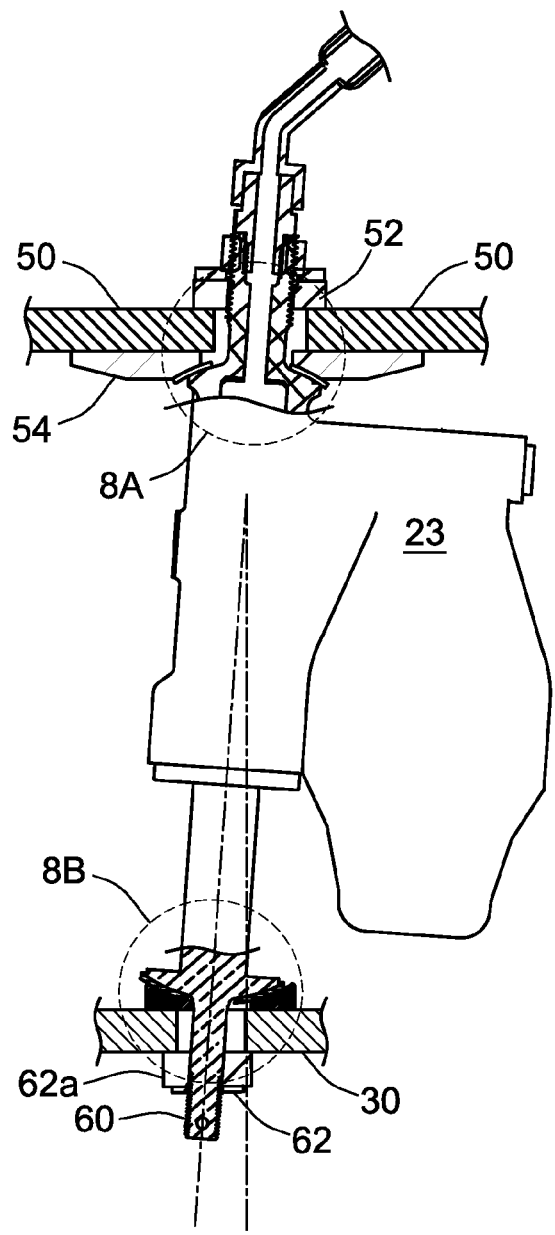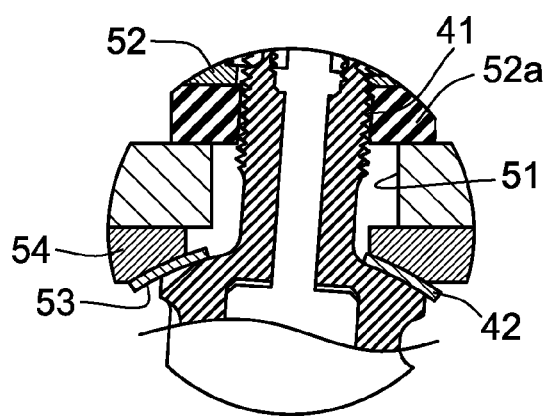
FIG. 8A
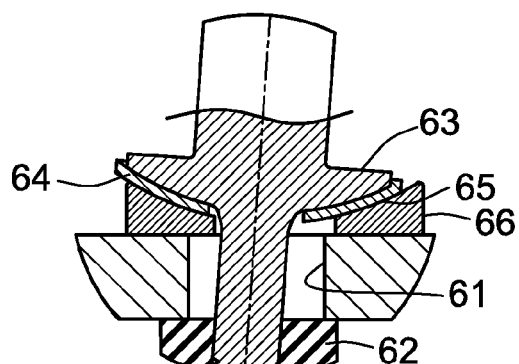
FIG. 7
FIG. 8B

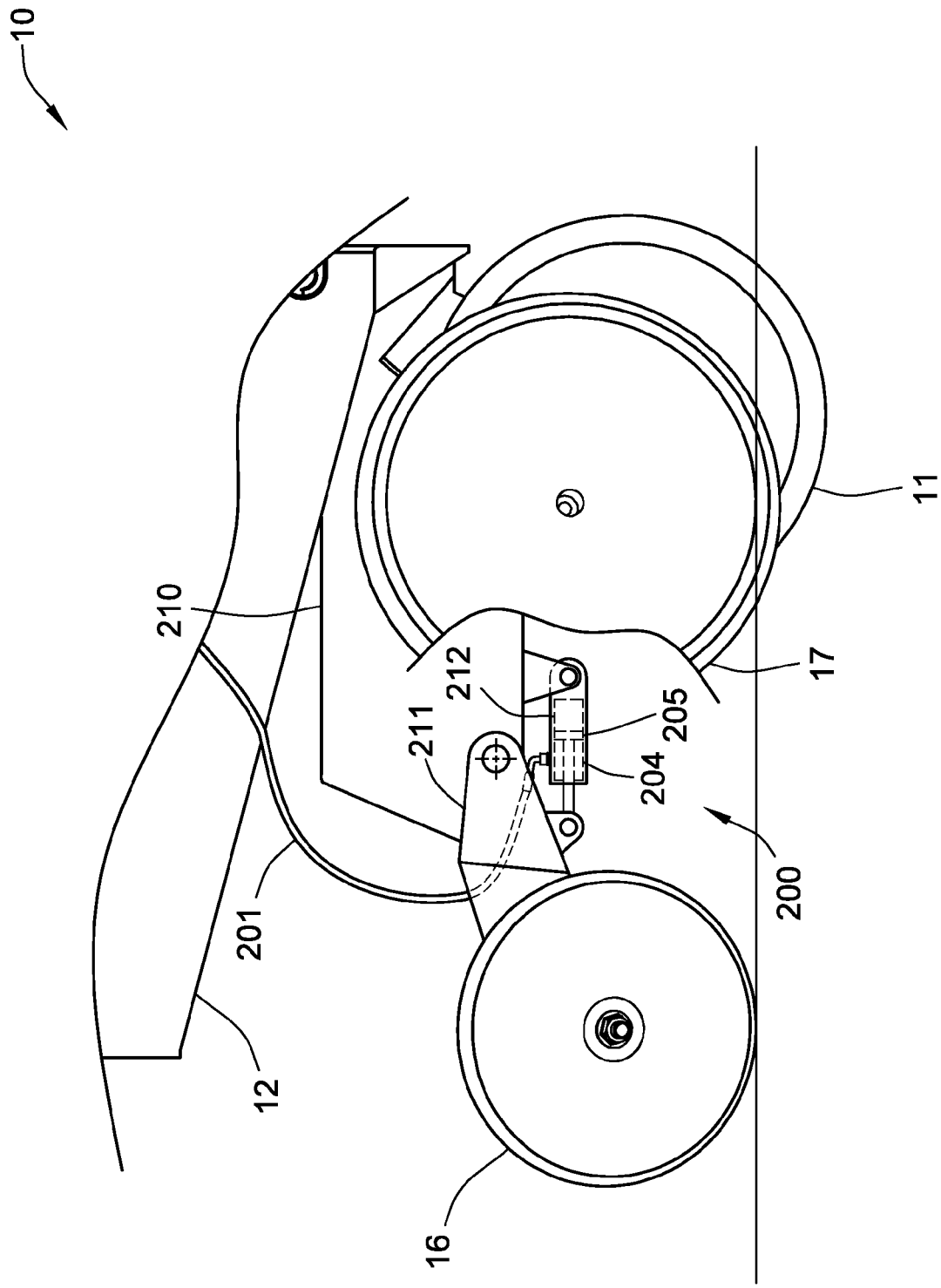

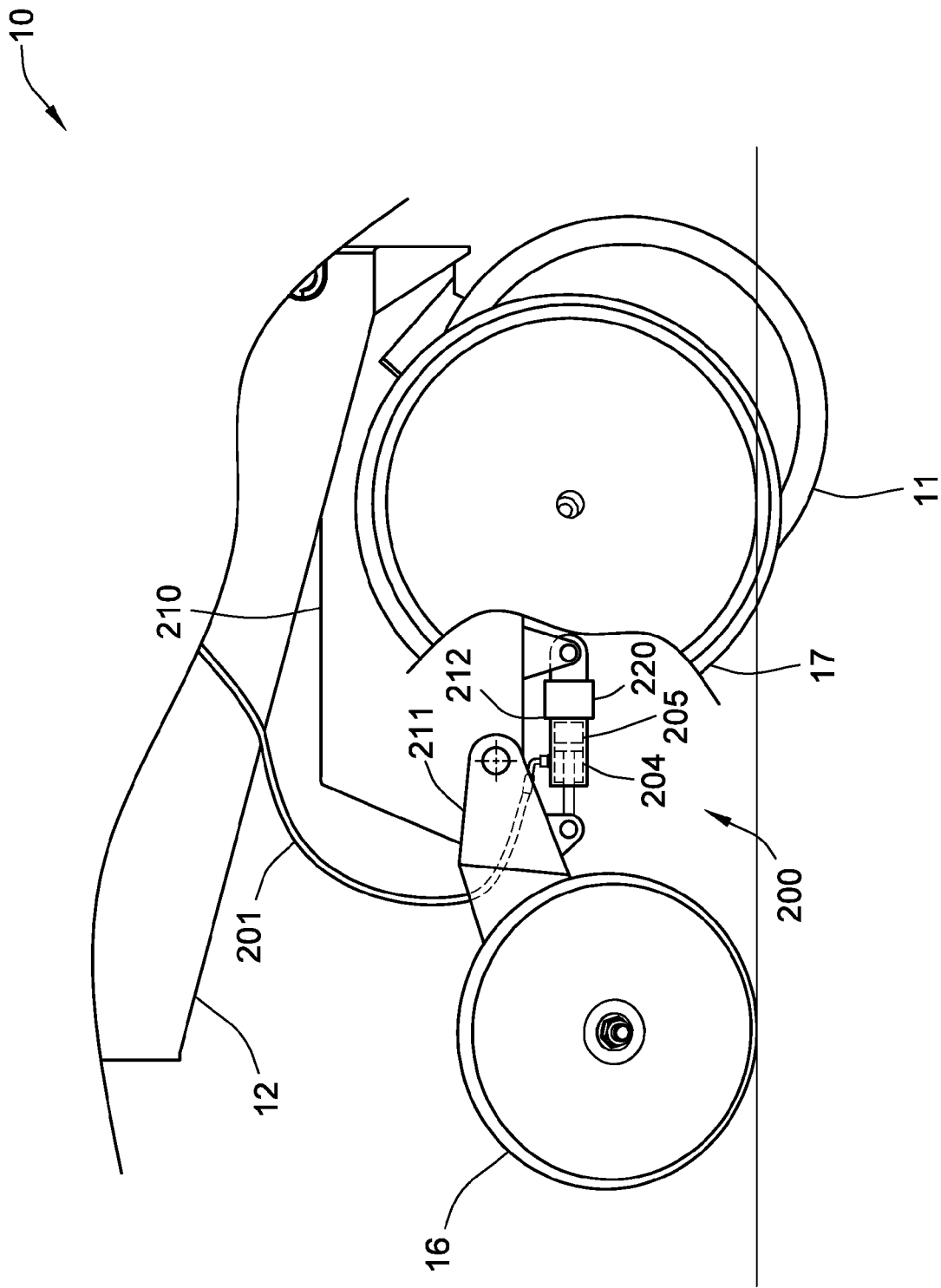

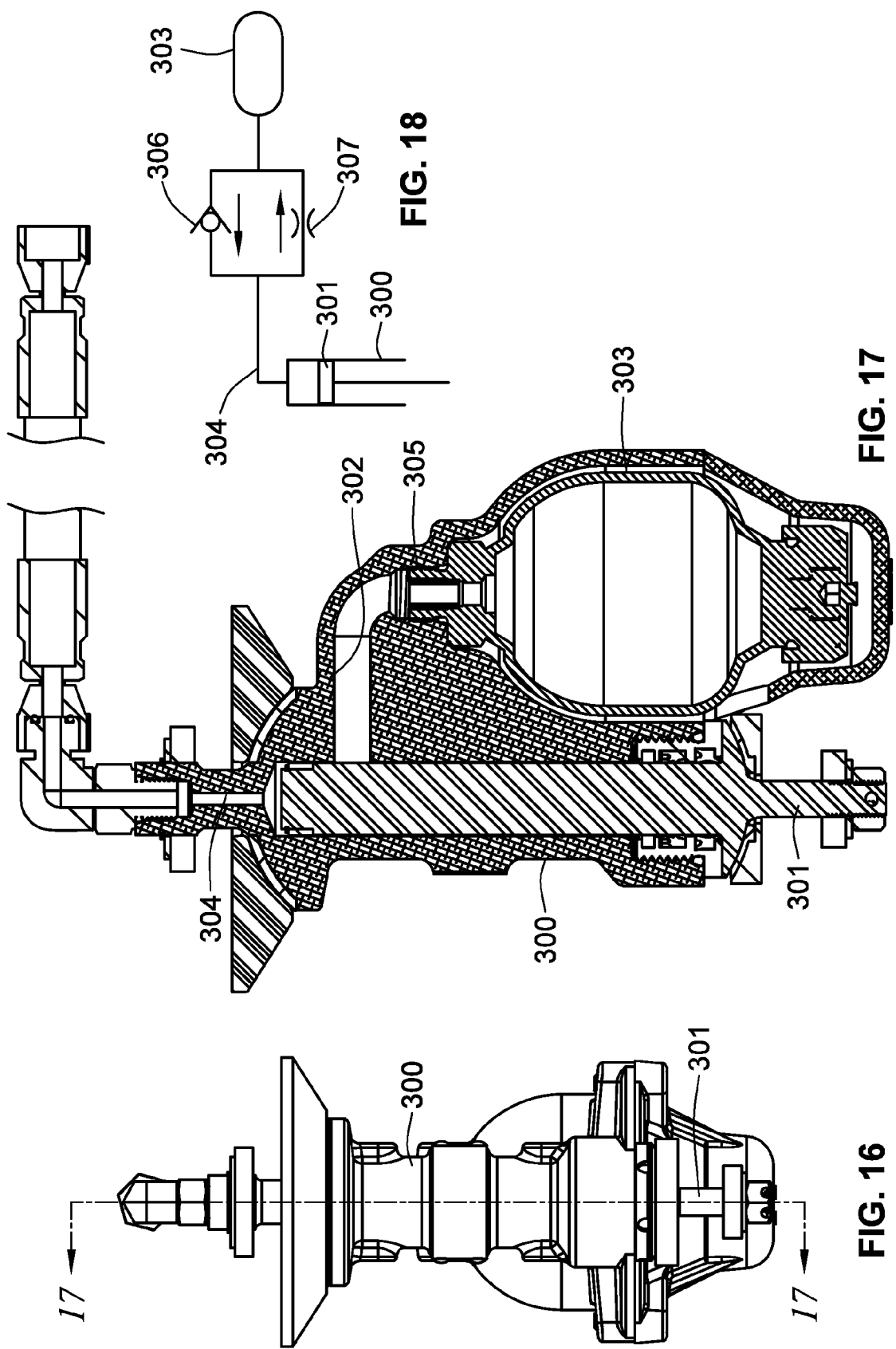

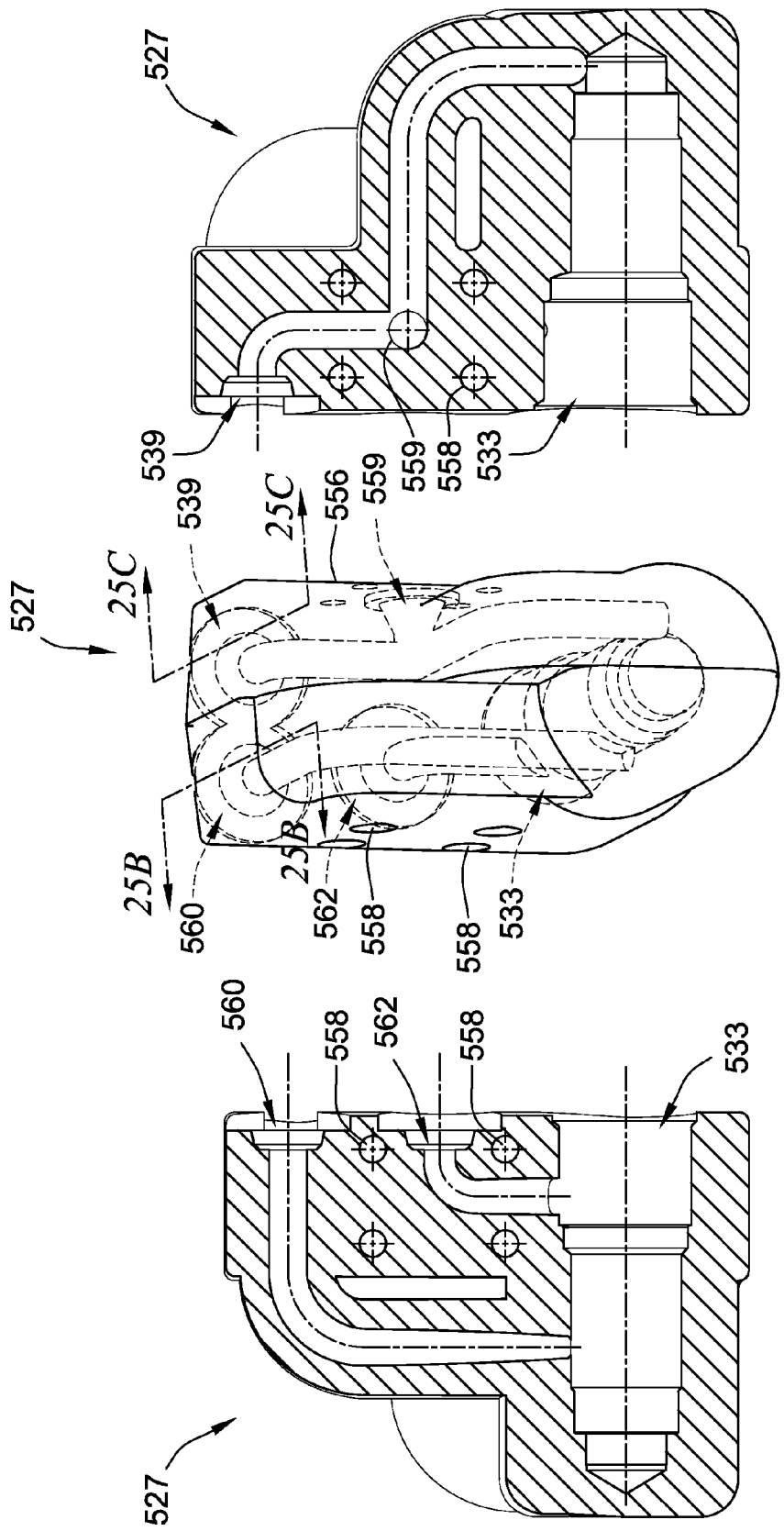

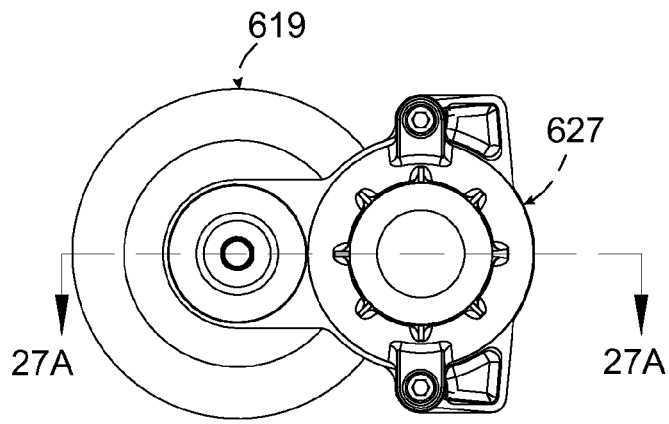
FIG. 26
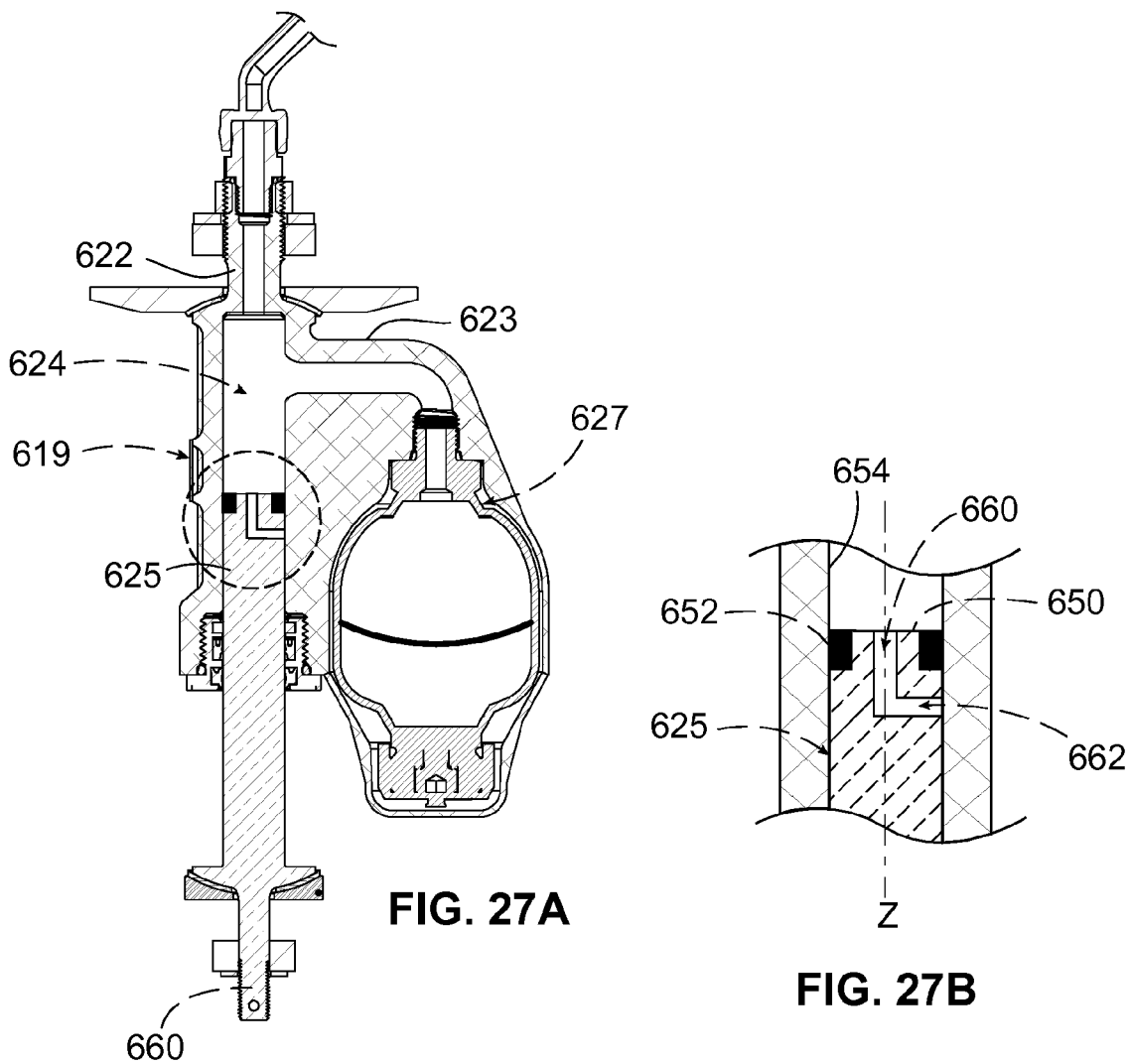
FIG. 27A
FIG. 27B

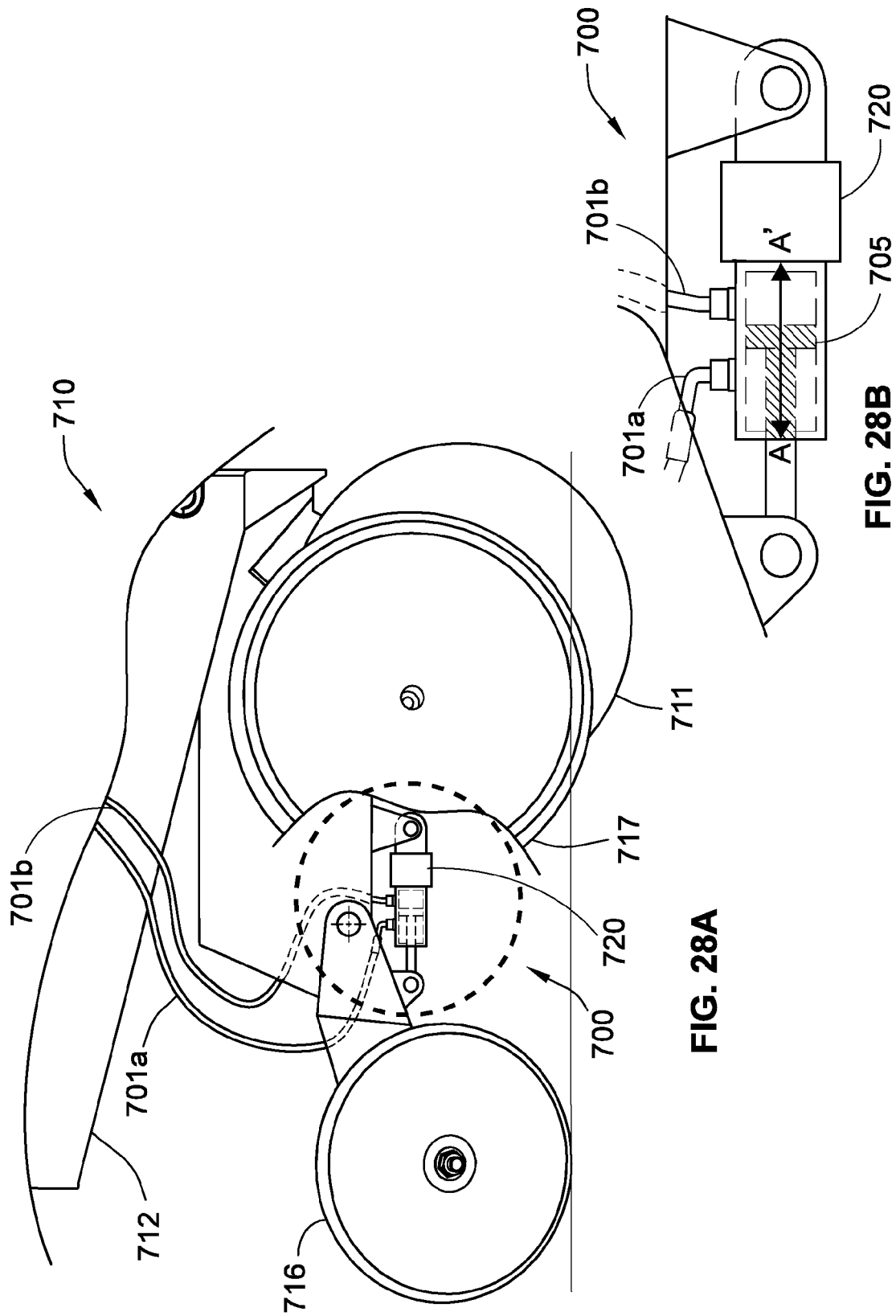

US 9,144,187 B2

AGRICULTURAL APPARATUS WITH HYDRAULIC CYLINDER AND MANIFOLD FOR A ROW UNIT

CROSS-REFERENCE TO RELATED APPLICATIONS

This application is a continuation of U.S. patent application Ser. No. 13/758,979, filed on Feb. 4, 2013, for an "Agricultural Apparatus With Integrated Controller For A Row Unit", which is a continuation-in-part of U.S. patent application Ser. No. 13/561,934, filed on Jul. 30, 2012, for a "Hydraulic Down Pressure Control System For Closing Wheels Of An Agricultural Implement", which is a continuation-in-part of U.S. patent application Ser. No. 13/075,574, filed on Mar. 30, 2011, for a "Hydraulic Down Pressure Control System For Closing Wheels Of An Agricultural Implement", which is a continuation-in-part of U.S. patent application Ser. No. 12/882,627, filed Sep. 15, 2010, for "Row Unit for Agricultural Implement", each of which is incorporated herein in its entirety.

FIELD OF THE INVENTION

The present invention relates to agricultural implements and, more particularly, to an agricultural apparatus with a manifold having or lacking a hydraulic control valve.

BACKGROUND OF THE INVENTION

As an agricultural planter row unit travels across fields with variable soil types, soil moisture, residue levels and topography, it is difficult to maintain constant seed depth and other parameters due to changing conditions which would ideally require varying the row unit down force pressure. For example, farming with higher residue levels also requires higher row unit down force levels as row cleaners, coulters and other attachments require applied force to keep them in the ground and at consistent depths.

At the same time, in many locations there are immoveable rocks or other obstructions at or below the soil surface which require the planter row unit to be able to quickly and freely (without undue increase in the row unit down force) rise up and over the obstruction freely and then quickly move back down, leaving a minimum amount of the row unplanted. All this must be accomplished at ground speeds of 6 mph or more. Today's planters typically include many individual row units, at times up to 120 ft wide, each of which may be encountering rocks etc. or have a need to float up or down independently.

Traditionally springs have been used to urge row units downward. Recently air bag systems have been used to overcome some of the drawbacks to air spring systems. Air systems provide a more uniform down force through the vertical range of travel, compared to springs, and are somewhat easier to adjust than springs. However due to the compressibility of air and the relatively large volumes required, changes in air pressure are very cumbersome and not adaptable to very fast change and response to in-cab controls on the go. Air bag systems typically have a very large cross-sectional area in relation to the hose feeding the air spring with pressure, which can provide a large multiplication of force and allow for relatively good isolation of one row unit relative to another. However, air bag systems typically do not allow for rapid change of the force being applied, because of the large volume of the air spring in relation to the cross section of the hose supplying the air.

Prior attempts to use devices such as combination spring/hydraulic shock absorbers do not provide ready adjustment on the go and tend to increase in force when rapidly striking a foreign object such as a rock requiring the row unit to quickly rise and come back down to resume planting. This increase in force levels can cause damage to the planter row unit components.

Some previous down-force systems use a spring and a hydraulic cylinder in series. In these systems the hydraulic cylinder does not directly control row unit down force, but rather is used to vary the amount of spring pressure applied to each unit.

Other systems use hydraulics with a central accumulator. However, with the accumulator separated from the force creating cylinder, pressure spikes can develop when hitting obstructions such as a rock at high speed since oil must be forced through hoses or tubes to the remotely located accumulator. This is especially problematic on planters having 50 or more row units.

As computers and GPS systems have allowed crop production to be managed in a location-specific way as an implement moves through the field, it has become necessary to achieve more rapid changes in the setting or adjustment of the implement. In the case of a planter row unit, it is also necessary to generate a large amount of force. Each individual planter row unit must be able to react to the soil it encounters independently of the other row units.

An air spring can allow for remote adjustment of the planter down pressure without stopping the forward motion of the implement, which is inefficient. Mechanical springs have historically required that the operator stop the implement, get out of the tractor, and make a manual adjustment. The slow rate at which an air spring system can be inflated or deflated means that even if a GPS system determines that a change needs to be made because of a programmed or sensed change in the local soil composition or conditions, by the time the pump can change the air pressure the implement has already moved too far forward of where the change needed to be made. This forces the average grid size in which active adjustments of the planter down pressure can be made to be quite large.

SUMMARY OF THE INVENTION

In one embodiment, an agricultural row unit includes an attachment frame adapted to be rigidly connected to a towing frame. A linkage assembly is pivotably coupled to the attachment frame to permit vertical pivoting movement of the linkage assembly relative to the attachment frame. A hydraulic cylinder is coupled to the linkage assembly for urging the linkage assembly downwardly toward the soil. A hose connection manifold is mounted adjacent to the hydraulic cylinder for circulating hydraulic fluid between a hydraulic source and the hydraulic cylinder. The hose connection manifold has a plurality of ports including an inlet port, an outlet port, and a valve port, the inlet port being adapted to receive an inlet hose, the outlet port being adapted to receive an outlet hose, and the valve port being adapted to receive an end of a hydraulic control valve.

In another embodiment, an agricultural system includes a hydraulic source for supplying pressurized hydraulic fluid, a towing frame attachable to a towing vehicle, and a first row unit and a second row unit attached to the towing frame. The first row unit includes a first hydraulic cylinder for urging the first row unit downwardly toward the soil, and a first hose connection manifold mounted adjacent the first hydraulic cylinder for circulating hydraulic fluid between the hydraulic source and the first hydraulic cylinder. The first hose connection manifold is a valve-less manifold. The second row unit includes a second hydraulic cylinder for urging the second row unit downwardly toward the soil, and a second hose connection manifold mounted adjacent the second hydraulic cylinder for circulating hydraulic fluid between the hydraulic source and the second hydraulic cylinder. The second hose connection manifold includes a hydraulic control valve.

BRIEF DESCRIPTION OF THE DRAWINGS

The invention may best be understood by reference to the following description taken in conjunction with the accompanying drawings, in which:

FIG. 7 is a side elevation of the unit shown in FIGS. 5 and 6 connected to a pair of supporting elements, with the support structures and the connecting portions of the hydraulic cylinder shown in section.

FIGS. 8A and 8B are enlarged cross sectional views of the supporting structures shown in section in FIG. 7.

FIG. 14 is a side elevation of a further modified embodiment having the hydraulic control unit coupled to the closing wheels of the row unit;

FIG. 15 is yet another modified embodiment having the hydraulic control unit coupled to the closing wheels of the row unit;

FIG. 16 is a side elevation of another modified embodiment of a hydraulic control unit;

FIG. 17 is an enlarged section taken along the line 17-17 in FIG. 16; and

FIG. 18 is a schematic diagram of the hydraulic circuit in the unit of FIGS. 16 and 17.

FIG. 25A is a perspective view of a control manifold.

FIG. 25B is a left cross-sectional view of the control manifold of FIG. 25A.

FIG. 25C is a right cross-sectional view of the control manifold of FIG. 25A.

FIG. 26 is a top plan view of a hydraulic cylinder for a row unit.

FIG. 27A is a vertical section taken along line 27A-27A in FIG. 26.

FIG. 27B is an enlarged view of a ram leading area that is shown in FIG. 27A.

FIG. 28A is a side elevation of a hydraulic control system with double-acting ram for use with a row unit.

FIG. 28B is an enlarged view illustrating a hydraulic control unit of the hydraulic control system of FIG. 28A.

DETAILED DESCRIPTION OF ILLUSTRATED EMBODIMENTS

Figure 1:
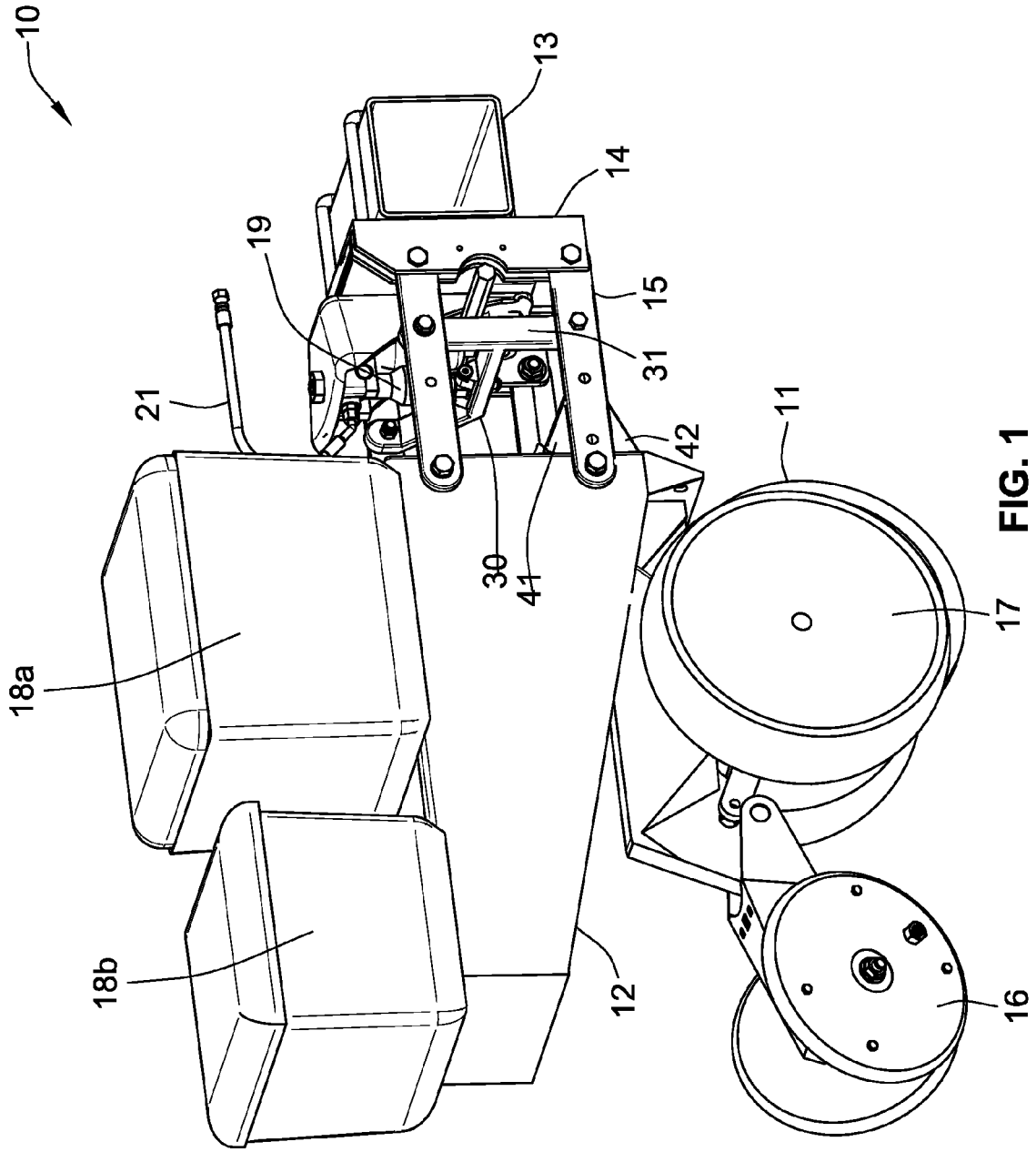
FIG. 1 is a perspective view of a planting row unit attached to a towing frame.

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Turning now to the drawings, a planting row unit 10 includes a furrow-opening device for the purpose of planting seed or injecting fertilizer into the soil. In the illustrated embodiment, the furrow-opening device is a V-opener 11 formed by a pair of conventional tilted discs depending from the leading end of a row unit frame 12. It will be understood that other furrow-opening devices may be used. A conventional elongated hollow towing frame 13 (typically hitched to a tractor by a draw bar) is rigidly attached to the front frame 14 of a conventional four-bar linkage assembly 15 that is part of the row unit 10. The four-bar (sometimes referred to as "parallel-bar") linkage assembly 15 is a conventional and well known linkage used in agricultural implements to permit the raising and lowering of tools attached thereto.

As the planting row unit 10 is advanced by the tractor, the V-opener 11 penetrates the soil to form a furrow or seed slot. Other portions of the row unit 10 then deposit seed in the seed slot and fertilizer adjacent to the seed slot, and close the seed slot by distributing loosened soil into the seed slot with a pair of closing wheels 16. A gauge wheel 17 determines the planting depth for the seed and the height of introduction of fertilizer, etc. Bins 18a and 18b on the row unit carry the chemicals and seed which are directed into the soil. The planting row unit 10 is urged downwardly against the soil by its own weight, and, in addition, a hydraulic cylinder 19 is coupled between the front frame 14 and the linkage assembly 15 to urge the row unit 11 downwardly with a controllable force that can be adjusted for different soil conditions. The hydraulic cylinder 19 may also be used to lift the row unit off the ground for transport by a heavier, stronger, fixed-height frame that is also used to transport large quantities of fertilizer for application via multiple row units.

Figure 4:
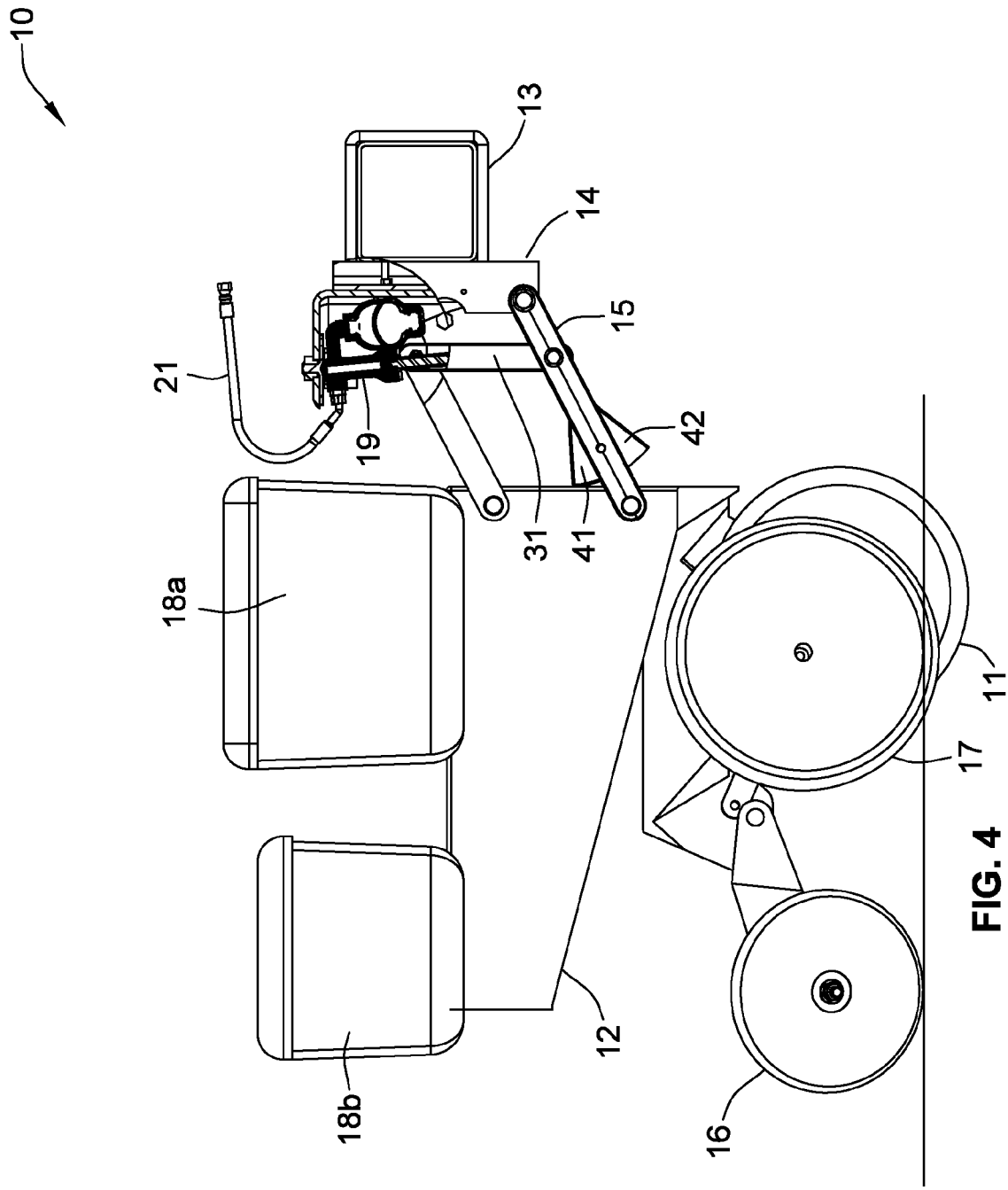
FIG. 4 is the same side elevation shown in FIG. 1 but with the linkage tilted downwardly to move the row unit to a lowered position.
Figure 5:
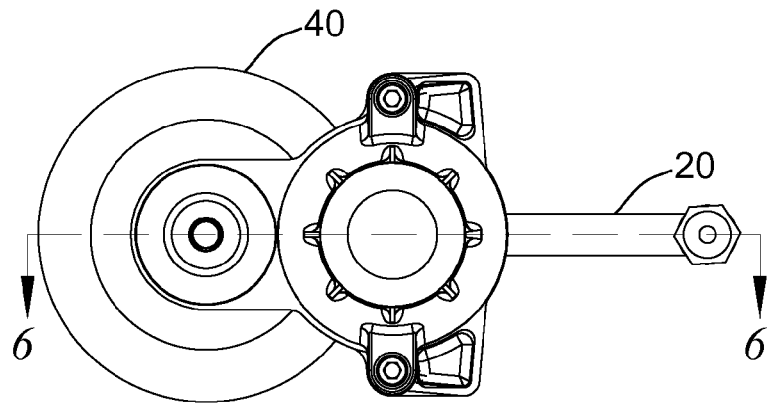
FIG. 5 is a top plan view of the hydraulic cylinder and accumulator unit included in the row unit of FIGS. 1-4.
Figure 6:
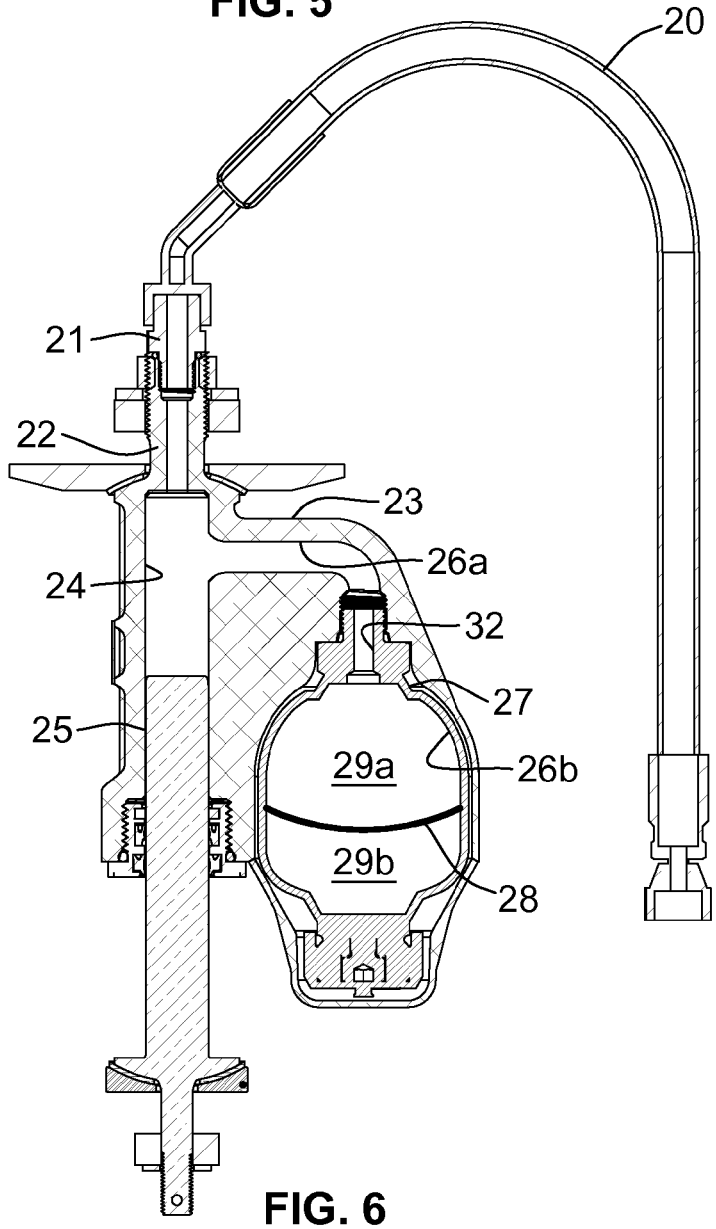
FIG. 6 is a vertical section taken along line 6-6 in FIG. 5.

The hydraulic cylinder 19 is shown in more detail in FIGS. 5 and 6. Pressurized hydraulic fluid from the tractor is supplied by a hose 20 to a port 21 that leads into a matching port 22 of a housing 23 that forms a cavity 24 of a hydraulic cylinder containing a ram 25. The housing 23 also forms a side port 26a that leads into cavity 26b that contains a gas-charged hydraulic accumulator 27. The lower end of the cavity 24 is formed by the top end surface of the ram 25, so that the hydraulic pressure exerted by the hydraulic fluid on the end surface of the ram 25 urges the ram downwardly (as viewed in FIG. 6), with a force determined by the pressure of the hydraulic fluid and the area of the exposed end surface of the ram 25. The hydraulic fluid thus urges the ram 25 in an advancing direction (see FIG. 4).

Figure 3:
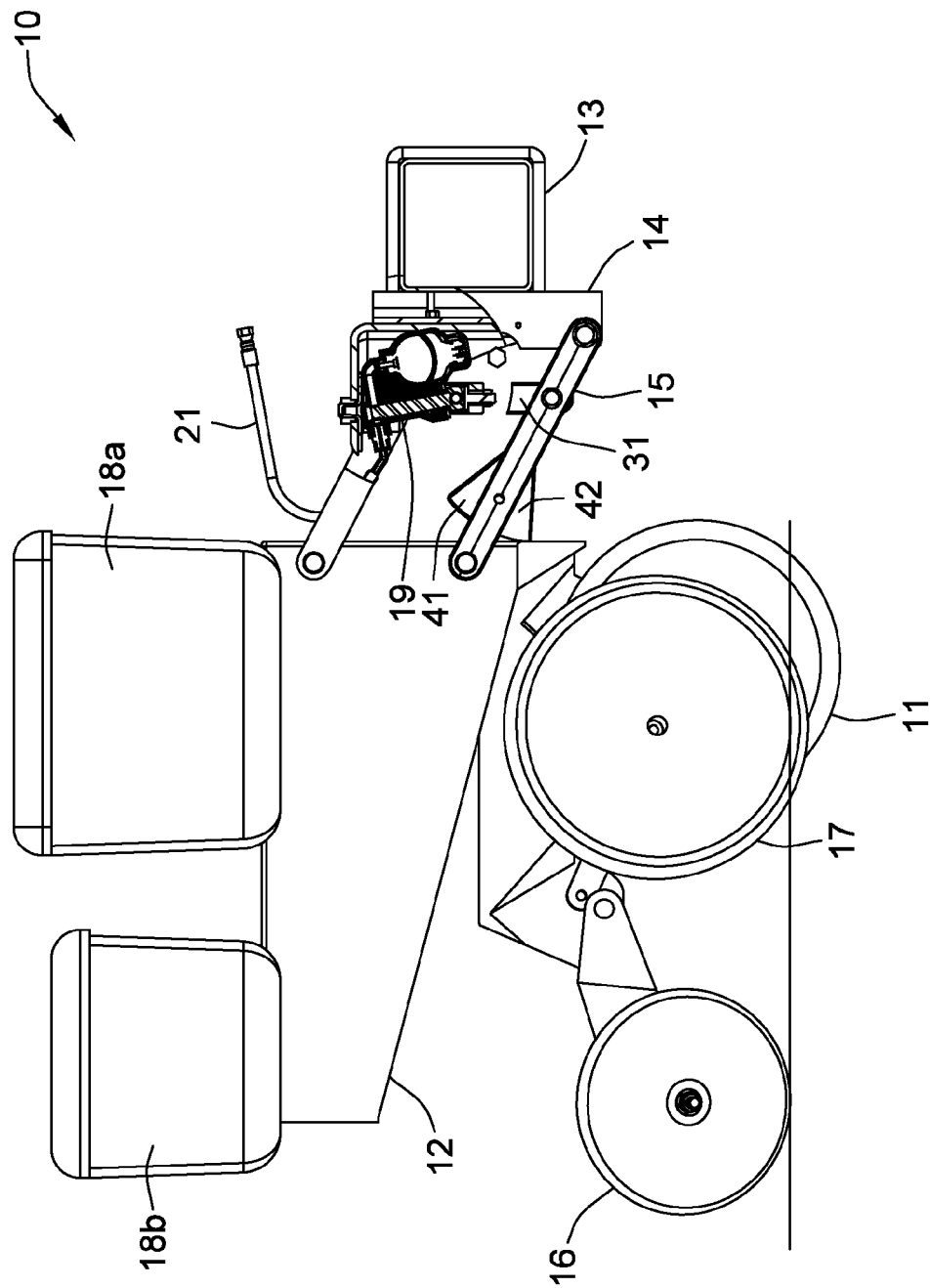
FIG. 3 is the same side elevation shown in FIG. 1 but with the linkage tilted upwardly to move the row unit to a raised position.
Figure 9:
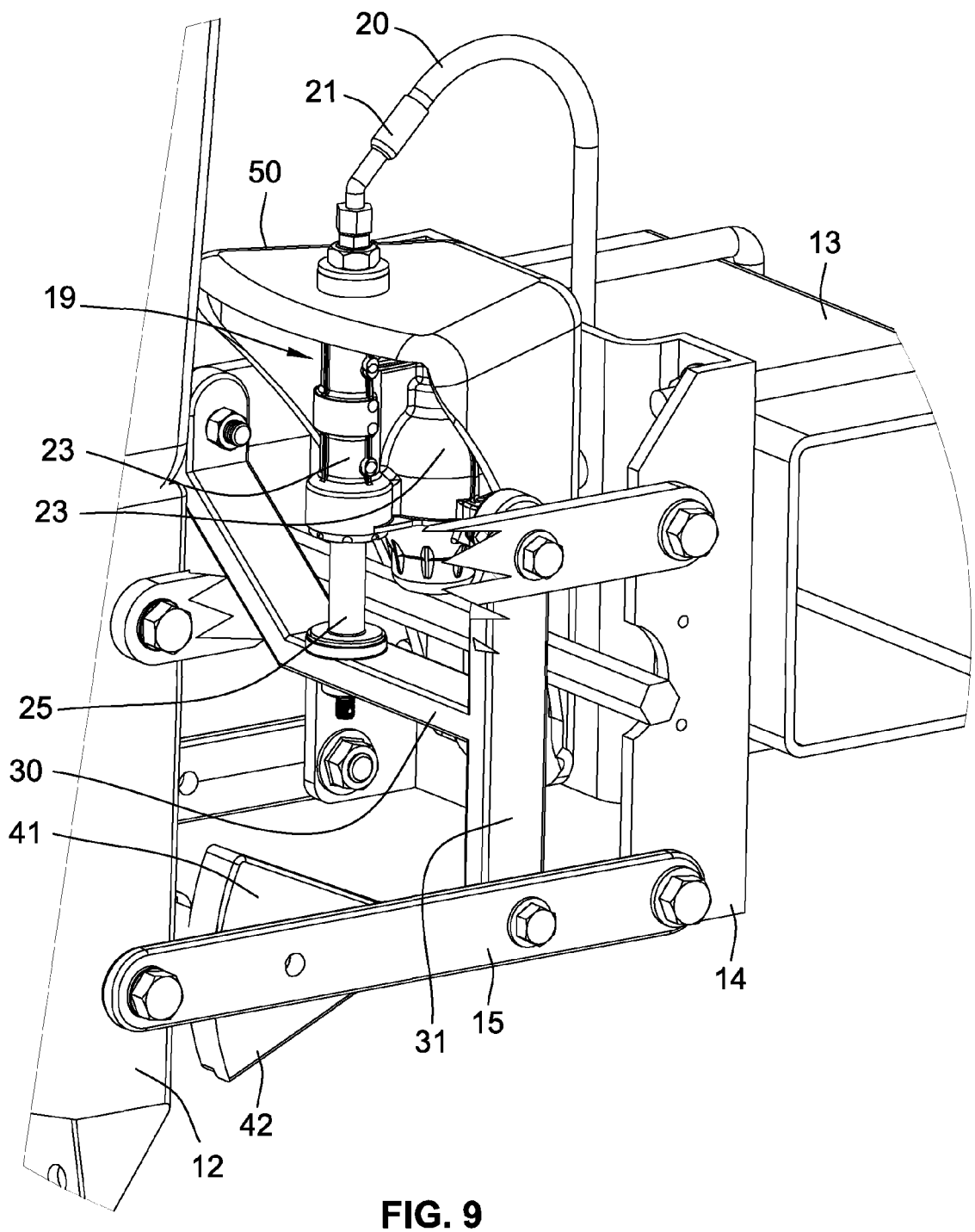
FIG. 9 is an enlarged perspective of the right-hand end portion of FIG. 1 with a portion of the four-bar linkage broken away to reveal the mounting of the hydraulic cylinder/accumulator unit.

As can be seen most clearly in FIG. 9, the hydraulic cylinder 19 and the accumulator 27 are mounted as a single unit on the front frame 14, with the lower end of the ram 25 connected to a cross bar 30 that is joined at one end to a vertical link 31. The upper and lower ends of the link 31 are pivotably attached to upper and lower links 15a and 15b, respectively, on one side of the four-bar linkage 15. The other end of the cross bar 30 is angled upwardly and pivotably attached to the upper link 15c on the opposite side of the four-bar linkage 15. With this mounting arrangement, retracting movement of the ram 25 into the cavity 24 tilts the linkage assembly 15 upwardly, as depicted in FIG. 3, thereby raising the row unit. Conversely, advancing movement of the ram 25 tilts the linkage assembly 15 downwardly, as depicted in FIG. 4, thereby lowering the row unit.

Figure 2:
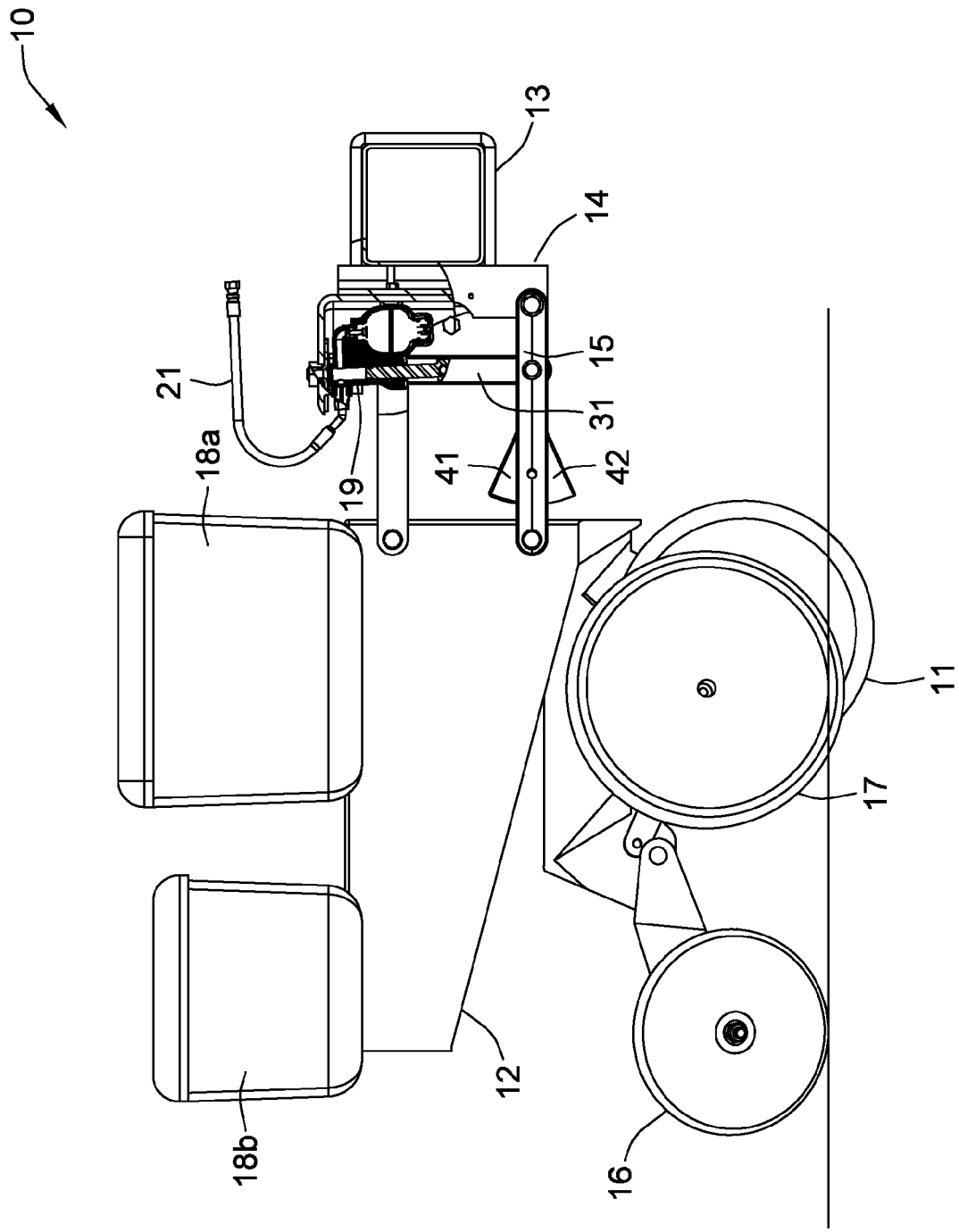
FIG. 2 is a partially sectioned side elevation of the planting row unit of FIG. 1 with the linkage that connects the row unit to the towing frame in a level position.

The accumulator 27 includes a diaphragm 28 that divides the interior of the accumulator into a hydraulic-fluid chamber 29a and a gas-filled chamber 29b, e.g., filled with pressurized nitrogen. FIG. 2 shows the ram 25 in a position where the diaphragm 28 is not deflected in either direction, indicating that the pressures exerted on opposite sides of the diaphragm are substantially equal. In FIG. 3, the ram 25 has been retracted by upward movement of the row unit, and the diaphragm 28 is deflected downwardly by the hydraulic fluid forced into the accumulator 27 by the retracting movement of the ram 25. In FIG. 4, the ram 25 has been moved to its most advanced position, and the diaphragm 28 is deflected upwardly by the air pressure as hydraulic fluid flows from the accumulator into the cavity 24. The use of this compact hydraulic down-force unit with an integral accumulator on each row unit provides the advantages of quick response and remote adjustability of a hydraulic down-force control system. If an obstruction requires quick movement, oil can flow quickly and freely between the force cylinder and the adjacent accumulator, without exerting force on other actuators in the system.

As can be seen in FIG. 4, advancing movement of the ram 25 is limited by engagement of stops 40, 42 on the lower links of the four-bar linkage 15, with the row unit frame 12. This prevents any further advancement of the ram 25. Advancing movement of the ram 25 expands the size of the cavity 24 (see FIG. 4), which causes the diaphragm 28 in the accumulator 27 to deflect to the position illustrated in FIG. 4 and reduce the amount of hydraulic fluid in the accumulator 27. When the ram 25 is in this advanced position, the row unit is in its lowermost position.

In FIG. 3, the ram 25 has been withdrawn to its most retracted position, which can occur when the row unit encounters a rock or other obstruction, for example. When the ram 25 is in this retracted position, the row unit is in its uppermost position. As can be seen in FIG. 3, retracting movement of the ram 25 is limited by engagement of stops 40, 42 on the lower links of the four-bar linkage 15, with the row unit frame 12.

Retracting movement of the ram 25 reduces the volume of the cavity 24 (see FIG. 3), which causes a portion of the fixed volume of hydraulic fluid in the cylinder 19 to flow into the chamber 29a of the accumulator 27, causing the diaphragm 28 to deflect to the position illustrated in FIG. 3. This deflection of the diaphragm 28 into the chamber 29b compresses the gas in that chamber. To enter the chamber 29a, the hydraulic fluid must flow through a port 32 in the top of the accumulator 27, which limits the rate at which the hydraulic fluid flows into the accumulator. This controlled rate of flow of the hydraulic fluid has a damping effect on the rate at which the ram 25 retracts or advances, thereby avoiding sudden large movements of the moving parts of the row unit, including the V-opener 11. This effect also minimizes vibration to improve accuracy of seed metering.

When the external obstruction causing the row unit 10 to rise is cleared, the combined effects of the pressurized gas in the accumulator 27 on the diaphragm 28 and the pressure of the hydraulic fluid return the ram 25 to a lower position. This downward force on the V-opener 11 holds it in the soil and prevents uncontrolled bouncing of the V-opener 11 over irregular terrain. The downward force applied to the V-opener 11 can be adjusted by changing the pressure of the hydraulic fluid supplied to the cylinder 19.

As can be seen in FIGS. 5 and 6, the single unitary housing 23 forms both the cavity 26b that contains the accumulator 27 and the cavity 24 of the hydraulic cylinder 19 and the fluid passageway 24 that connects the cavity 24 of the hydraulic cylinder 19 to the cavity 27 of the accumulator. By integrating the hydraulic cylinder 19 and the accumulator 27 in a single housing, there is no relative motion possible between the cylinder 19 and the accumulator 27, with minimal possibility for fluid passageways to act like orifices. The cylinder 19 and the accumulator 27 remain in fixed positions relative to each other regardless of the movements of the planter row unit via the linkage assembly 15. In this way the upward motion of the ram 25 that occurs when the planter row unit rolls over an obstruction is directly converted into compression of the gas in the accumulator 27 without restriction. It also allows the accumulator 27, which is by definition an energy storage device, to be mounted in a fully enclosed and safe housing. The accumulator 27 can be securely mounted to avoid puncture or rapid discharge (if it comes loose), or damage from hitting another part of the implement or a foreign object. The integrated cylinder and accumulator is also a convenient single package for installation and replacement and minimizes the number of hydraulic hoses and adapters (potential leakage points).

FIGS. 7, 8A and 8B illustrate in more detail how the illustrative hydraulic cylinder/accumulator unit is attached to the front frame 14 and the linkage assembly 15. The top of the unitary housing 23 forms a stem 41 that projects upwardly through a hole 51 in a bracket 50 attached to the front frame 14. The outer surface of the stem 41 is threaded to receive a nut 52 that connects the housing 23 to the bracket 50. The hole 51 is oversized and a rubber washer is installed on the stem 41 between the nut 52 and the bracket 50 to allow a limited amount of tilting movement of the housing relative to the bracket 50. At the base of the stem 41, beneath the bracket 50, the housing 23 forms a shoulder 43 that engages a conical bearing ring 53 that also engages a mating lower surface of a washer 54. Thus, the housing 23 can be tilted relative to the axis of the hole 51, with the shoulder 43 sliding over the lower surface of the bearing ring 53.

A similar arrangement is provided at the lower end of the ram 25, where a stem 60 extends downwardly through a hole 61 in the cross bar 30 that is pivotably attached to the linkage assembly 15. A nut 62 is threaded onto the stem 60 to connect the ram to the cross bar 30. The hole 61 is oversized and a rubber washer is installed on the stem 60 between the nut 62 and the cross bar 30 to allow a limited amount of tilting movement of the ram 25 relative to the cross bar 30. Above the cross bar 30, a flange 63 on the ram 25 forms a curved conical surface 64 that engages a mating surface of a curved conical bearing ring 65 that also engages a mating upper surface of a washer 66. Thus, the ram 25 can be tilted relative to the axis of the hole 61, with the flange 63 sliding over the upper surface of the bearing ring 65.

The use of a hydraulic system permits on-the-go adjustments to be made very rapidly because the hydraulic fluid is incompressible and therefore acts more directly than an air system. In addition, hydraulic fluids typically operate at higher pressures, which allows greater changes in applied forces. The accumulator 27 allows the fluid system to flex and float with the changing terrain and soil conditions. The accumulator 27 is preferably centrally mounted so that when any single row unit moves over an obstruction, the down-pressure cylinder 19 moves to displace the hydraulic fluid along a common set of lines connecting all row units. The gas in the accumulator is compressed at the same time, allowing for isolation among the row units so that upward movement of one row unit does not cause downward movement of other row units. Although the illustrative hydraulic ram is single-acting, it is also possible to use a double-acting ram, or a single-acting ram in combination with a return spring.

Another advantage of the compact hydraulic cylinder/accumulator unit is that it can conveniently mounted to the same brackets that are provided in many row units for mounting an air bag, to control the down pressure on the row unit. For example, in FIG. 9, the brackets 50 and 51 on which the hydraulic cylinder/accumulator is mounted are the brackets that are often connected to an air bag, and thus the same row unit can be used interchangeably with either an air bag or the hydraulic cylinder/accumulator to control the down pressure on the row unit.

Figure 10:
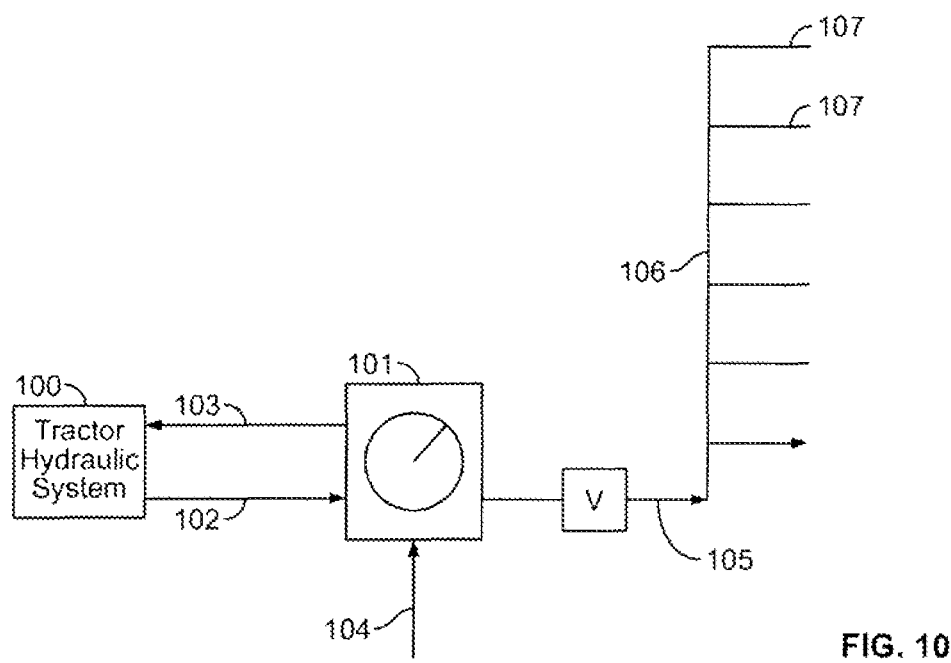
FIG. 10 is a schematic diagram of a first hydraulic control system for use with the row unit of FIGS. 1-9.

FIG. 10 is a schematic of a hydraulic control system for supplying pressurized hydraulic fluid to the cylinders 19 of multiple row units. A source 100 of pressurized hydraulic fluid, typically located on a tractor, supplies hydraulic fluid under pressure to a valve 101 via supply line 102 and receives returned fluid through a return line 103. The valve 101 can be set by an electrical control signal S1 on line 104 to deliver hydraulic fluid to an output line 105 at a desired constant pressure. The output line is connected to a manifold 106 that in turn delivers the pressurized hydraulic fluid to individual feed lines 107 connected to the ports 21 of the respective hydraulic cylinders 19 of the individual row units. With this control system, the valve 101 is turned off, preferably by a manually controlled on/off valve V, after all the cylinders 19 have been filled with pressurized hydraulic fluid, to maintain a fixed volume of fluid in each cylinder.

Figure 11:
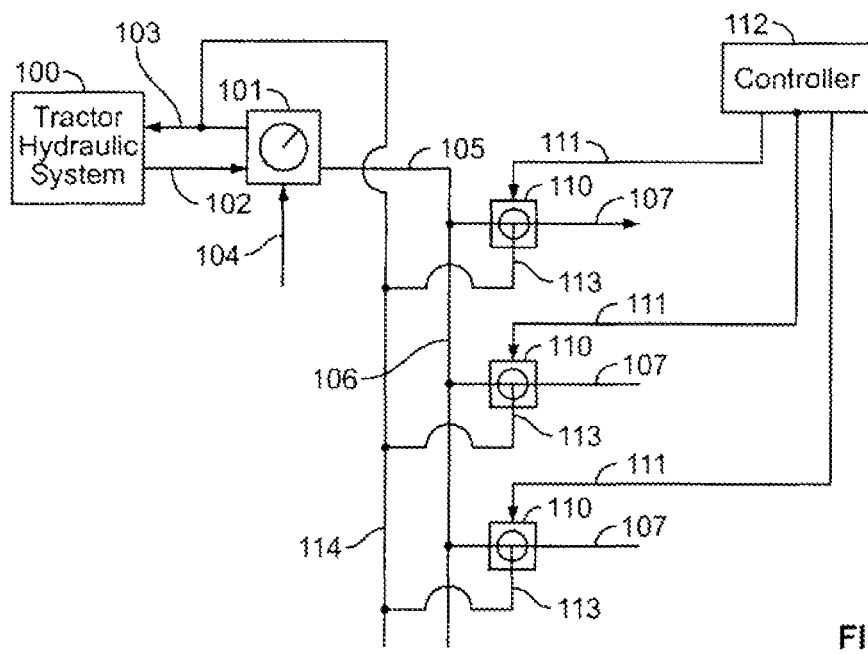
FIG. 11 is a schematic diagram of a second hydraulic control system for use with the row unit of FIGS. 1-9.

FIG. 11 is a schematic of a modified hydraulic control system that permits individual control of the supply of hydraulic fluid to the cylinder 19 of each separate row unit via feed lines 107 connected to the ports 21 of the respective cylinders 19. Portions of this system that are common to those of the system of FIG. 10 are identified by the same reference numbers. The difference in this system is that each separate feed line 107 leading to one of the row units is provided with a separate control valve 110 that receives its own separate control signal on a line 111 from a controller 112. This arrangement permits the supply of pressurized hydraulic fluid to each row unit to be turned off and on at different times by the separate valve 110 for each unit, with the times being controlled by the separate control signals supplied to the valves 110 by the controller 112. The individual valves 110 receive pressurized hydraulic fluid via the manifold 106, and return hydraulic fluid to a sump on the tractor via separate return line 113 connected to a return manifold 114 connected back to the hydraulic system 100 of the tractor.

Figure 12:
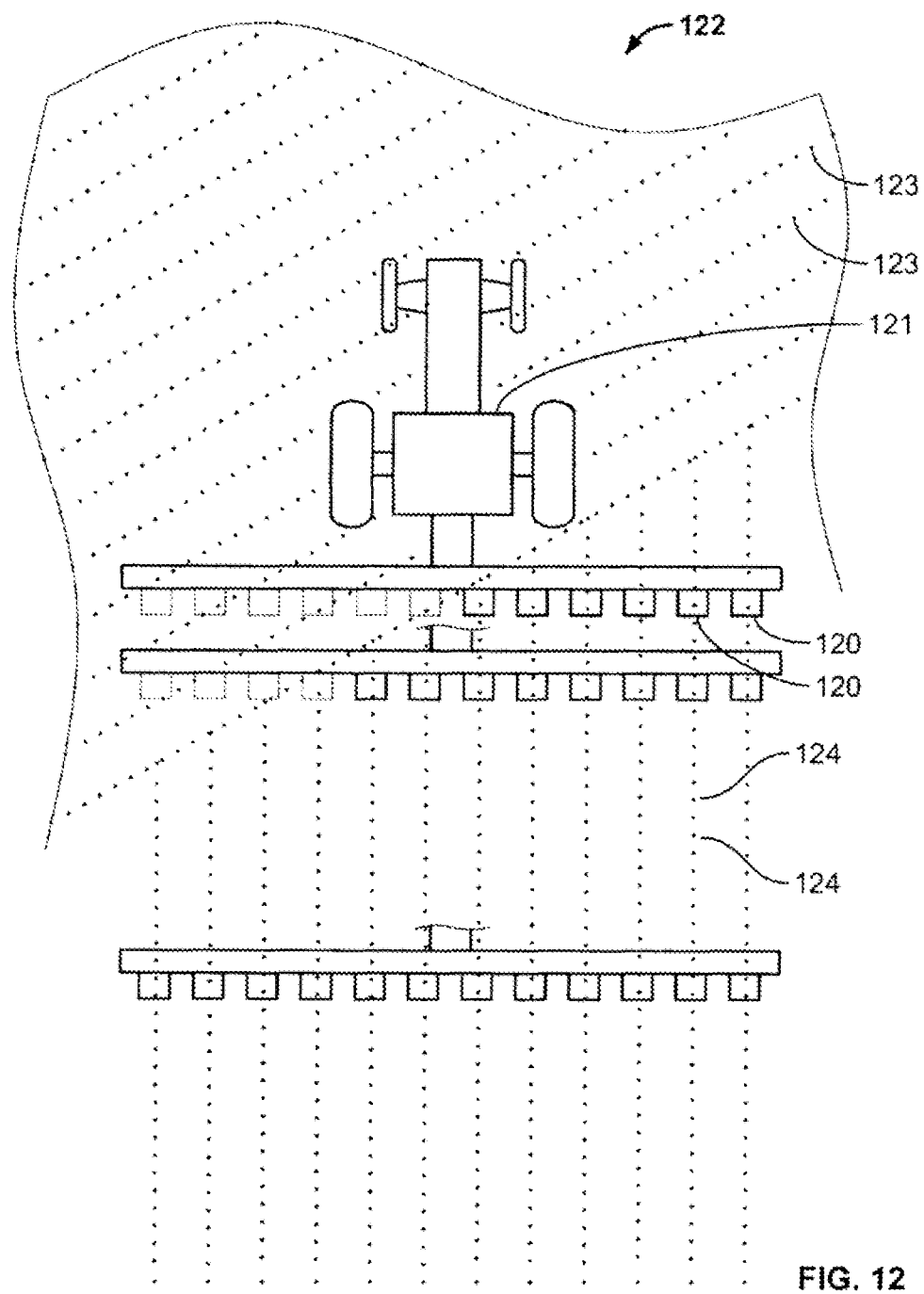
FIG. 12 is a diagram illustrating one application of the hydraulic control system of FIG. 11.

FIG. 12 illustrates on application for the controllable hydraulic control system of FIG. 11. Modern agricultural equipment often includes GPS systems that enable the user to know precisely where a tractor is located in real time. Thus, when a gang of planting row units 120 towed by a tractor 121 begins to cross a headland 122 in which the rows 123 are not orthogonal to the main rows 124 of a field, each planting row unit 120 can be turned off just as it enters the headland 122, to avoid double-planting while the tractor 121 makes a turn through the headland. With the control system of FIG. 11, the hydraulic cylinder 19 of each row unit can also be separately controlled to turn off the supply of pressurized hydraulic fluid at a different time for each row unit, so that each row unit is raised just as it enters the headland, to avoid disrupting the rows already planted in the headland.

One benefit of the system of FIG. 11 is that as agricultural planters, seeders, fertilizer applicators, tillage equipment and the like become wider with more row units on each frame, often 36 30-inch rows or 54 20-inch rows on a single 90-foot wide toolbar, each row unit can float vertically independently of every other row unit. Yet the following row units still have the down force remotely adjustable from the cab of the tractor or other selected location. This permits very efficient operation of a wide planter or other agricultural machine in varying terrain without having to stop to make manual adjustment to a large number of row units, resulting in a reduction in the number of acres planted in a given time period. One of the most important factors in obtaining a maximum crop yield is timely planting. By permitting remote down force adjustment of each row unit (or group of units), including the ability to quickly release all down force on the row unit when approaching a wet spot in the field, one can significantly increase the planter productivity or acres planted per day, thereby improving yields and reducing costs of production.

On wide planters or other equipment, at times 90 feet wide or more and planting at 6 mph or more forward speed, one row unit must often rise or fall quickly to clear a rock or plant into an abrupt soil depression. Any resistance to quick movement results in either gouging of the soil or an uncleared portion of the field and reduced yield. With the row unit having its own hydraulic accumulator, the hydraulic cylinder can move quickly and with a nearly constant down force. Oil displaced by or required by quick movement of the ram is quickly moved into or out of the closely mounted accumulator which is an integral part of each row unit. The accumulator diaphragm or piston supplies or accepts fluid as required at a relatively constant pressure and down force as selected manually or automatically by the hydraulic control system. By following the soil profile closely and leaving a more uniform surface, the toolbar-frame-mounted row unit permits the planter row unit following independently behind to use less down force for its function, resulting in more uniform seed depth control and more uniform seedling emergence. More uniform seedling stands usually result in higher yields than less uniform seedling stands produced by planters with less accurate row cleaner ground following.

Figure 13:
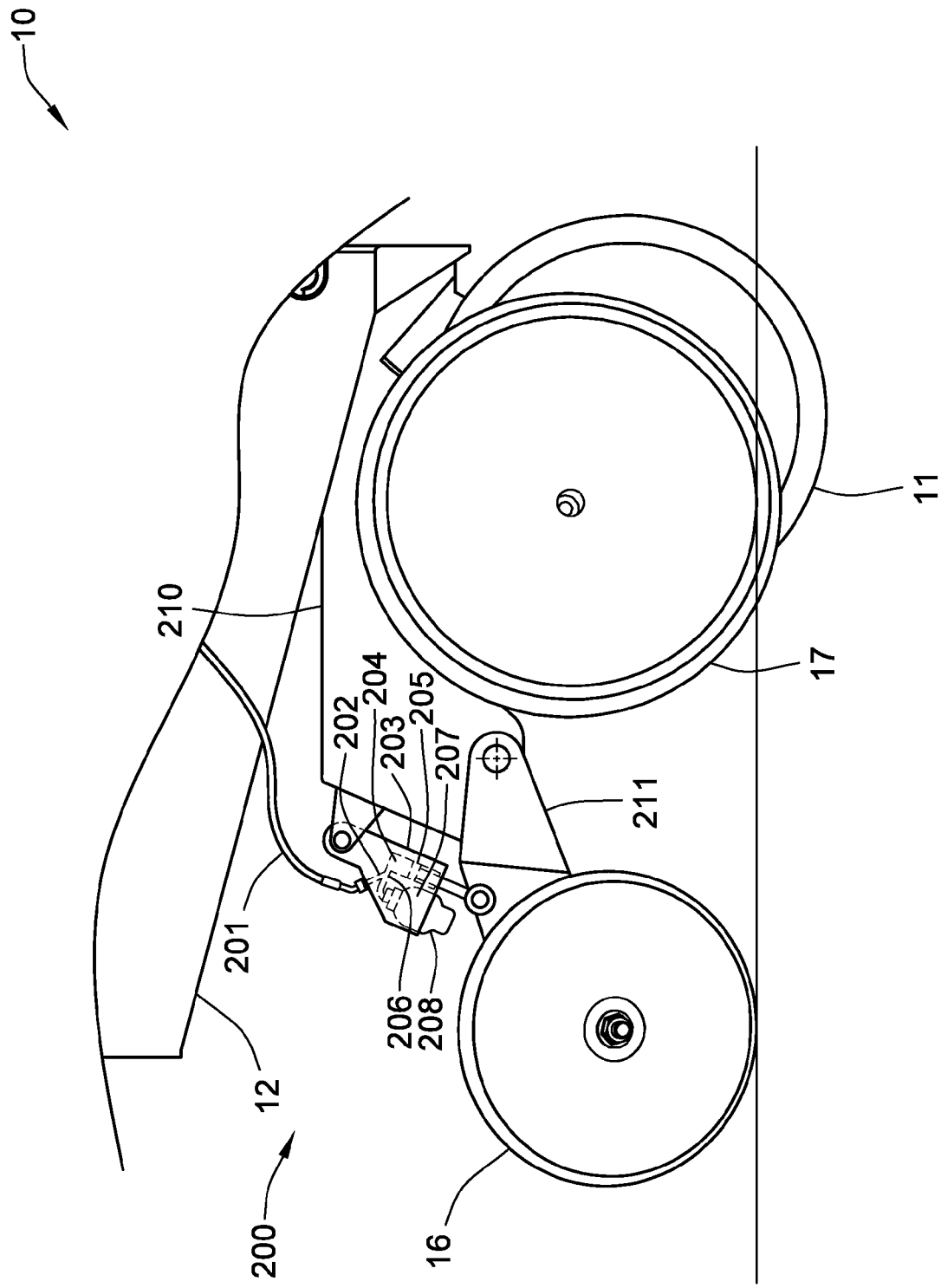
FIG. 13 is a side elevation of a modified embodiment having the hydraulic control unit coupled to the closing wheels of the row unit.

FIGS. 13-15 illustrate modified embodiments in which the hydraulic cylinder 200 urges the closing wheels 16 downwardly with a controllable force that can be adjusted for different conditions. Referring first to FIG. 13, pressurized hydraulic fluid from the tractor is supplied by a hose 201 to a port 202 of a housing 203 that forms a cavity of a hydraulic cylinder 204 containing a ram 205. The housing 203 also forms a side port 206 that leads into a cavity 207 that contains a gas-charged hydraulic accumulator 208. The lower end of the cavity 204 is formed by the top end surface of the ram 205, so that the hydraulic pressure exerted by the hydraulic fluid on the end surface of the ram 205 urges the ram downwardly (as viewed in FIG. 13), with a force determined by the pressure of the hydraulic fluid and the area of the exposed end surface of the ram 205. The hydraulic fluid thus urges the ram 205 in a downward direction.

The hydraulic cylinder 204 and the accumulator 208 are pivotably mounted as a single unit on the row unit frame 210, with the lower end of the ram 205 pivotably connected to a linkage 211 that carries the closing wheels 16. With this mounting arrangement, advancing movement of the ram 205 in the cylinder 204 tilts the linkage 211 downwardly, thereby urging the closing wheels 16 downwardly. Conversely, retracting movement of the ram 205 tilts the linkage 211 upwardly, thereby raising the closing wheels 16.

FIG. 14 illustrates an arrangement similar to FIG. 13 except that the hydraulic cylinder 204 is charged with a pressurized gas in chamber 212 on the side of the ram 205 that is not exposed to the pressurized fluid from the hose 201. Thus, as the ram 205 is retracted by increasing the hydraulic pressure on one side of the ram, the gas on the other side of the ram is compressed and thus increases the resistance to retracting movement of the ram. The hydraulic cylinder 204 is positioned such that advancing movement of the ram 205 in the cylinder 204 tilts the linkage 211 upwardly, thereby raising the closing wheels 16. Conversely, retracting movement of the ram 205 tilts the linkage 211 downwardly, thereby urging the closing wheels 16 downwardly with an increased force. To increase the downward pressure on the closing wheels 16, the hydraulic pressure must overcome the gas pressure that increases as the ram 205 is retracted, but upward movement of the closing wheels (e.g., when an obstruction is encountered) requires only that the ram be advanced with sufficient pressure to overcome that of the hydraulic fluid.

In FIG. 15, the arrangement is the same as in FIG. 14, but the hydraulic control unit has an added biasing element 220 on the side of the ram 205 that is not exposed to the pressurized hydraulic fluid. This biasing element 220 may be in addition to, or in place of, pressurized gas in the hydraulic cylinder 204. The biasing element 220 may be formed by various types of mechanical springs, such as a compressed coil spring, or may be pressurized air, nitrogen or other gas.

FIGS. 16-18 illustrate a modified hydraulic control unit that includes a hydraulic cylinder 300 containing a ram 301 that can be coupled at its lower end to a device on which the down pressure is to be controlled. Pressurized hydraulic fluid is supplied to the upper end of the cylinder 301 through a port 304. The cylinder 300 includes a side port 302 leading to an accumulator 303 of the type described above in connection with FIGS. 5 and 6. The entry port 305 to the accumulator 303 is equipped with a check valve 306 and restriction 307 as illustrated in FIG. 18. When the ram 301 is in a lowered position that opens the port 302, and is moved upwardly by an upward force applied by engagement of the controlled device with a rock or other obstruction, hydraulic fluid flows from the cylinder 300 into the accumulator 303 via the restriction 307. The restriction acts as a damper to reduce the shock on the equipment and avoid excessive upward movement of the ram 301. When the upward force on the ram has been removed, hydraulic fluid flows from the accumulator back into the cylinder 300 via the check valve 306, which allows unrestricted flow in this direction so that the controlled device quickly re-engages the ground with the down pressure exerted by the hydraulic fluid on the upper end of the ram 301. The check valve unit can be easily installed in the accumulator entry port 305. Additionally, the check valve unit can have an orifice system that is bidirectional for damping motion, both in and out.

The term row unit refers to a unit that is attached to a towing frame in a way that permits the unit to move vertically relative to the towing frame and other units attached to that same towing frame. Most row units are equipped to form, plant and close a single seed furrow, but row units are also made to form, plant and close two or more adjacent seed furrows.

Figure 19:
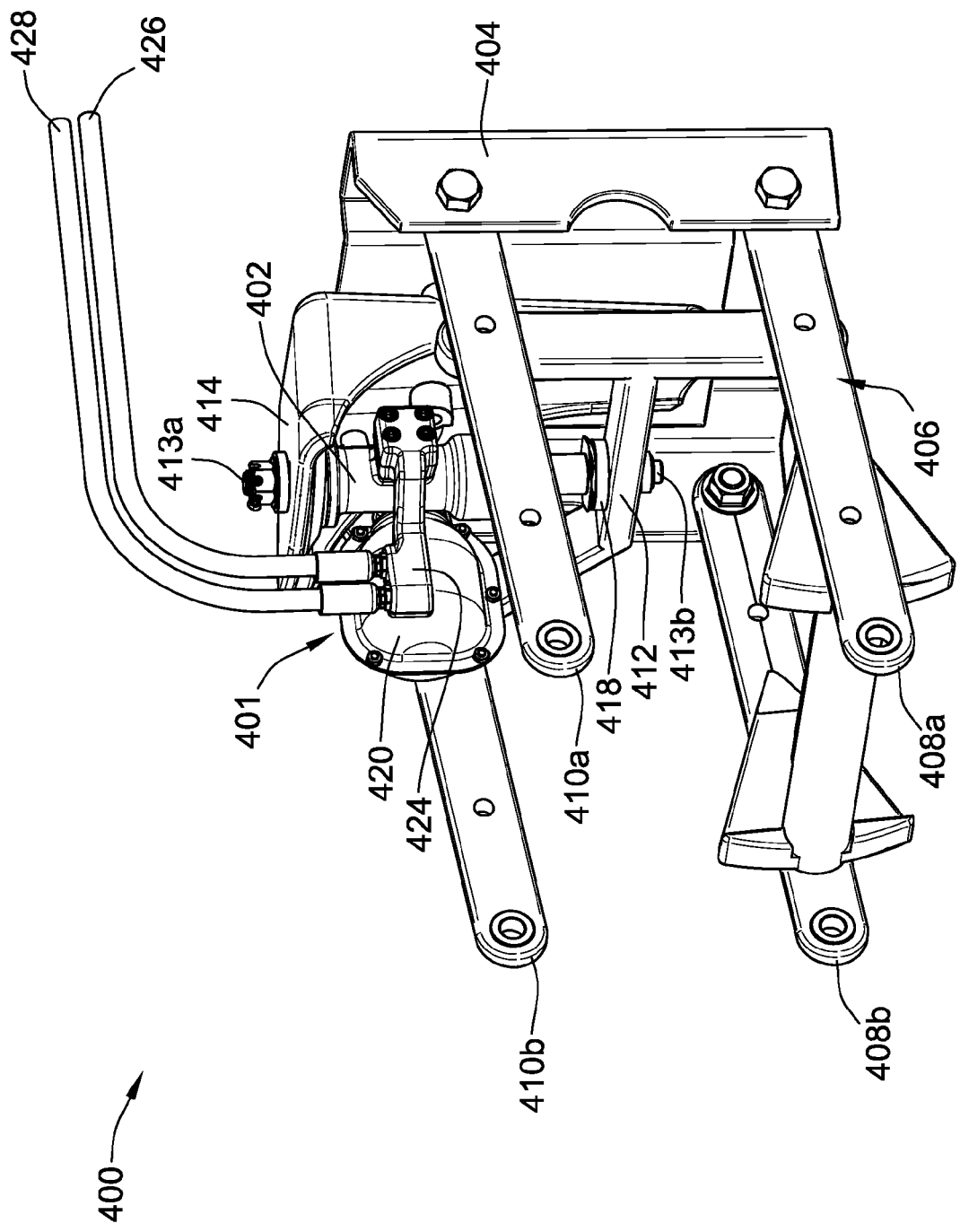
FIG. 19 is a perspective view of a standard configuration of a hydraulic system.

Referring to FIG. 19, a hydraulic system 400 includes a hydraulic assembly 401, a front frame 404, and a four-bar linkage assembly 406. The four-bar linkage assembly 406 is generally similar to the four-bar linkage assembly 15 described above in reference to FIGS. 1-9. The four-bar linkage assembly 406 includes a pair of parallel lower links 408a, 408b, a pair of parallel upper links 410a, 410b, and a cross bar 412. The hydraulic assembly 401 is rigidly attached to the four-bar linkage assembly 406 on a row-unit side, and the front frame 404 is pivotally attached to the four-bar linkage assembly 406 on a towing side.

The hydraulic assembly 401 includes a hydraulic cylinder 402, an accumulator protective cover 420, and a hose connection manifold 424. The hydraulic cylinder 402 is generally similar to the hydraulic cylinders 19, 204 described above in reference to FIGS. 1-9 and 13-18, and includes an upper end 413a and a lower end 413b. The upper end is mounted to a bracket 414 of the linkage assembly 406, and the lower end 413b is mounted to the cross bar 412 of the linkage assembly 406. A gland and securing nut 418 (with internal seals) is interposed at the lower end 413b between the hydraulic cylinder 402 and the cross bar 412.

The accumulator protective cover 420 is mounted adjacent to and between a left upper link 410b and the hydraulic cylinder 402. The accumulator protective cover 420 shields from environmental contaminants and physical damage an accumulator 422 (shown in FIG. 20A). In addition to protecting the accumulator 422, the accumulator protective cover 420 itself is provided with protection from physical damage, e.g., caused by debris, rocks, etc., by being located between the pair of upper links 410a, 410b. Although the upper links 410, 410b do not completely shield the accumulator protective cover 420, the upper links 410, 410b provide some protection from physical damage while, simultaneously, allowing ease of access for servicing and/or replacing the accumulator 422.

Figure 21:
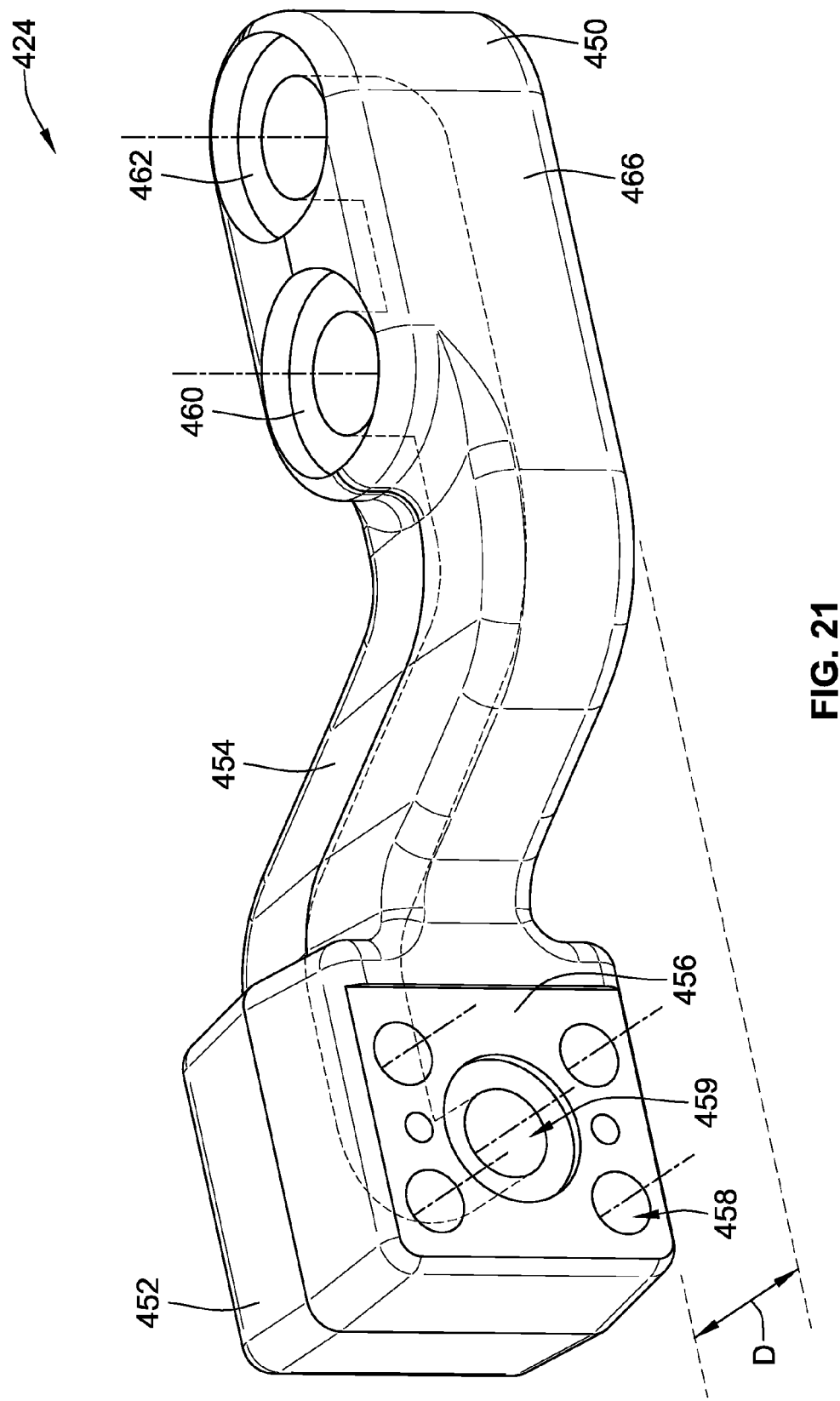
FIG. 21 is a perspective view of a hose connection manifold.

The hose connection manifold 424, which is described in more detail below in reference to FIG. 21, is mounted adjacent to and between a right upper link 410a and the hydraulic cylinder 402. The hose connection manifold 424 is configured such that it does not interfere with any of the other components of the hydraulic system 400, including the right upper link 410a, the hydraulic cylinder 402, and the accumulator protective cover 420. The hose connection manifold 424 is coupled at a distal end to a pair of hydraulic fluid hoses, including an inlet hose 426 and an outlet hose 428. Assuming a configuration in which a plurality of units are arranged in a parallel (or side-by-side) configuration, the inlet hose 426 receives and delivers hydraulic fluid from an adjacent row unit, and the outlet hose 428 connects to another adjacent row unit.

The attachment of the hoses 426, 428 to the hose connection manifold 424, in a position that is spaced away from the relatively more-cluttered area of the hydraulic cylinder 402 and bracket 414, facilitates easy field servicing of the hoses 426, 428. For example, a user can easily couple/uncouple the hoses 426, 428 to/from the hose connection manifold 424 by having a clear path directly to the hose connection manifold 424.

Figure 20A:
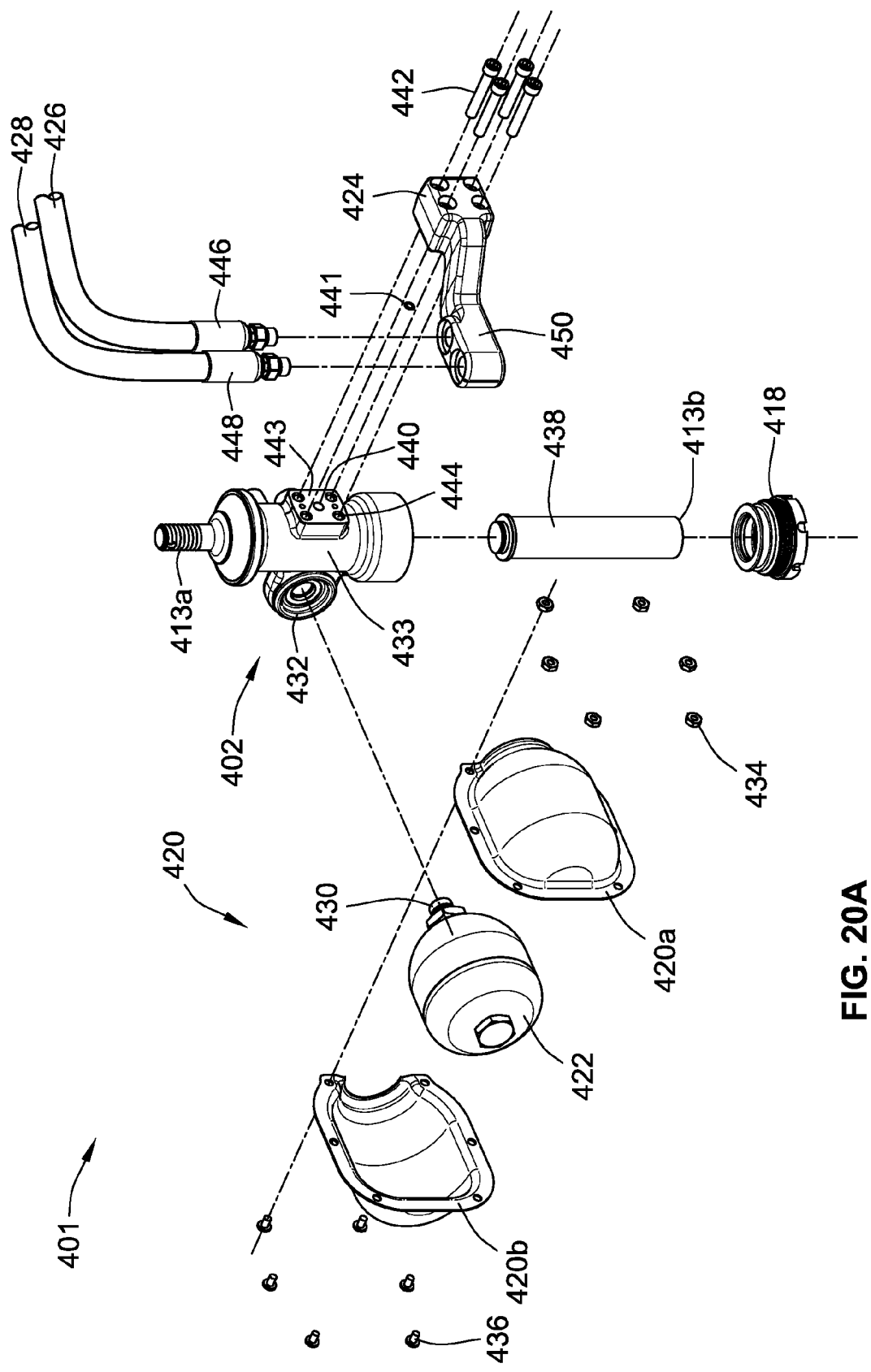
FIG. 20A is an exploded view of a standard configuration of a hydraulic assembly.
Figure 20B:
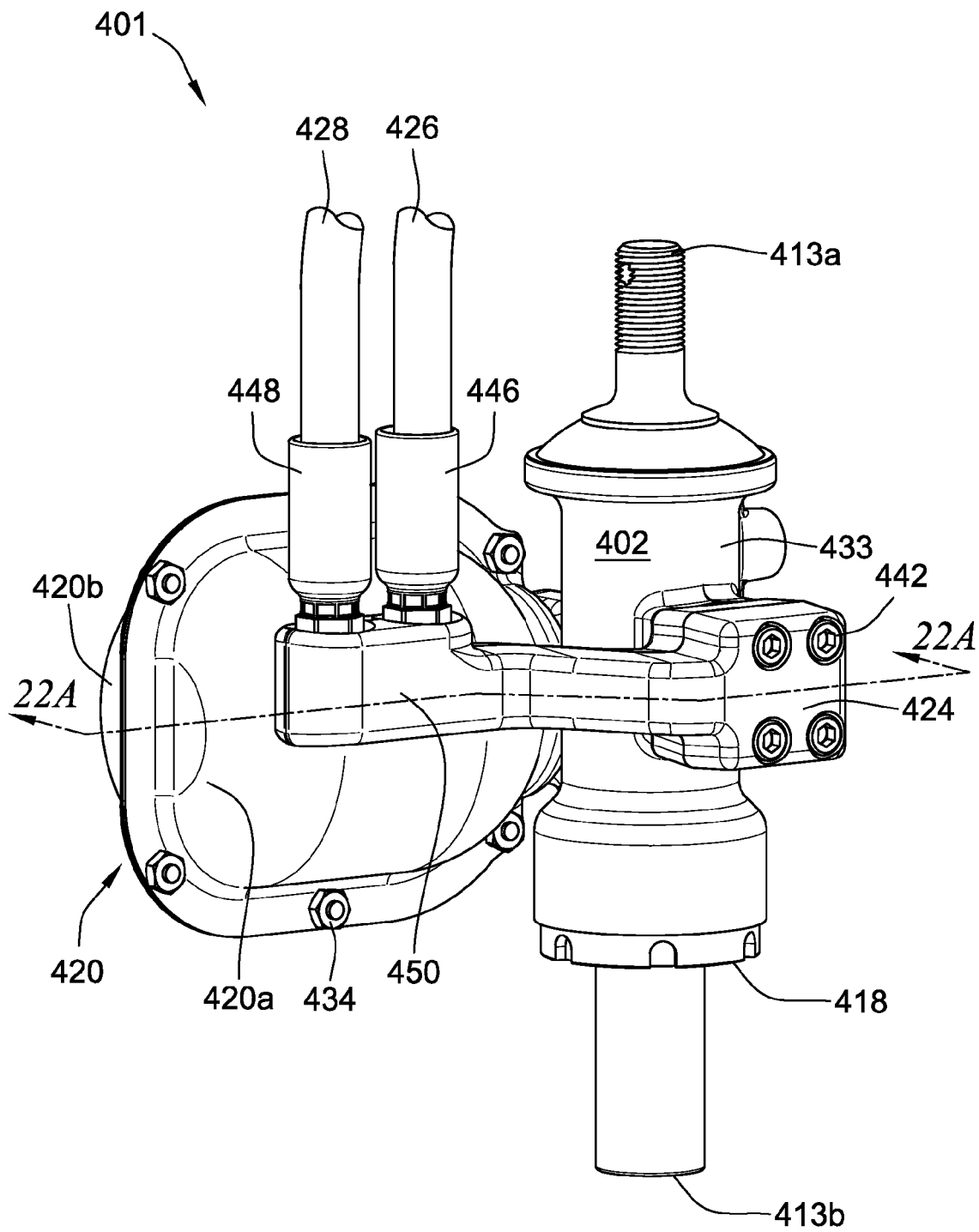
FIG. 20B is an assembled perspective view of FIG. 20A.

Referring to FIGS. 20A and 20B, the accumulator protective cover 420 includes a right cover 420a and a left cover 420b that are fastened to each other via a plurality of small nuts 434 and bolts 436. Enclosed within the accumulator protective cover 420 is the accumulator 422, which has an accumulator end 430 that is inserted into a accumulator receiver 432 of the hydraulic cylinder 402. The accumulator receiver 432 extends from a main body 433 of the hydraulic cylinder 402 a sufficient distance to permit the mounting of the accumulator protective cover 420 without interfering with the hose connection manifold 424 (as further illustrated in FIG. 22A).

The main body 433 of the hydraulic cylinder 402 receives a spherical rod 438 for axial mounting below the accumulator receiver 432. The gland 418 is threaded into the hydraulic cylinder 402 after the spherical rod 438 is installed on the hydraulic cylinder 402. The gland 418 contains internal seals and wear rings to hold pressure and seal out contaminants.

The hydraulic cylinder 402 further includes a mounting interface 440 extending from the main body 433 in an opposite direction relative to the accumulator receiver 432. The hose connection manifold 424 is mounted directly to the mounting interface 440 via a plurality of long bolts 442 that are received, respectively, in a plurality of threaded holes 444. An O-ring seal 441 is positioned between the control manifold 424 and the hydraulic cylinder 402 to prevent leakage of hydraulic fluid. The hose connection manifold 424 has a mounting face 456 (shown in FIG. 21) that is aligned, when mounted, in contact with a receiving face 443 of the mounting interface 440. As illustrated in the exemplary embodiment, the mounting face 456 of the hose connection manifold 424 and the receiving face 443 of the mounting interface 440 are configured such that they are complementary mating faces with the O-ring seal 441 holding pressure between the components.

The mounting interface 440 further facilitates a modular exchange between hose connection manifolds of different types. In the current illustration, the hose connection manifold 424 is an example of a standard configuration in which the manifold functions solely to attach hydraulic hoses and to circulate hydraulic fluid between the hydraulic source and the hydraulic cylinder 402. In an alternative configuration, described in more detail below in reference to FIGS. 23-25C, the same mounting interface 440 (without reliance on additional components or tools) is used to attached a manifold of a different type. This modular exchange between different manifold types is beneficial for quick and easy replacement of the manifolds based on current planting needs, which can quickly change in real time due to weather conditions, terrain conditions, etc.

A pair of hose ends 446, 448 are attached to the hose connection manifold 424 at a distal end 450 for coupling the inlet and outlet hoses 426, 428. Specifically, an inlet hose-end 446 is coupled to the inlet hose 426 and an outlet hose-end 446 is coupled to the outlet hose 428. The hose ends 446, 448 are attached to the distal end 450 in a generally parallel configuration relative to a central axis of the hydraulic cylinder 402. As discussed above, the attachment configuration of the hose ends 446, 448 to the hose connection manifold 424 facilitates easy access and servicing of the inlet and outlet hoses 426, 428.

Referring to FIG. 21, the hose connection manifold 424 is a valve-less manifold that lacks a control valve or a control module (in contrast to the integrated control manifold 524 discussed below in reference to FIGS. 23-25C). The hose connection manifold 424 has a mounting end 452 that is separated from the distal end 450 by a manifold arm 454. The manifold arm 454 includes a curved section that offsets the mounting face 456 of the mounting end 452 by a distance D from an exterior surface 466 of the distal end 450. The offset distance D is helpful in minimizing space requirements for mounting the hose connection manifold 424 within the space defined by the upper links 410, 410b of the linkage assembly 406. The manifold arm 454 is positioned generally parallel to the accumulator 422.

The mounting face 456 includes a plurality of mounting holes 458 arranged in a concentric pattern around a central hydraulic hole 459, through which hydraulic fluid is delivered to the hydraulic cylinder 402. The pattern of the mounting holes 458 matches a pattern of the threaded holes 444 of the mounting interface 440. When the hose connection manifold 424 is mounted to the hydraulic cylinder 402, the long bolts 442 are received through the mounting holes 458.

Figure 22A:
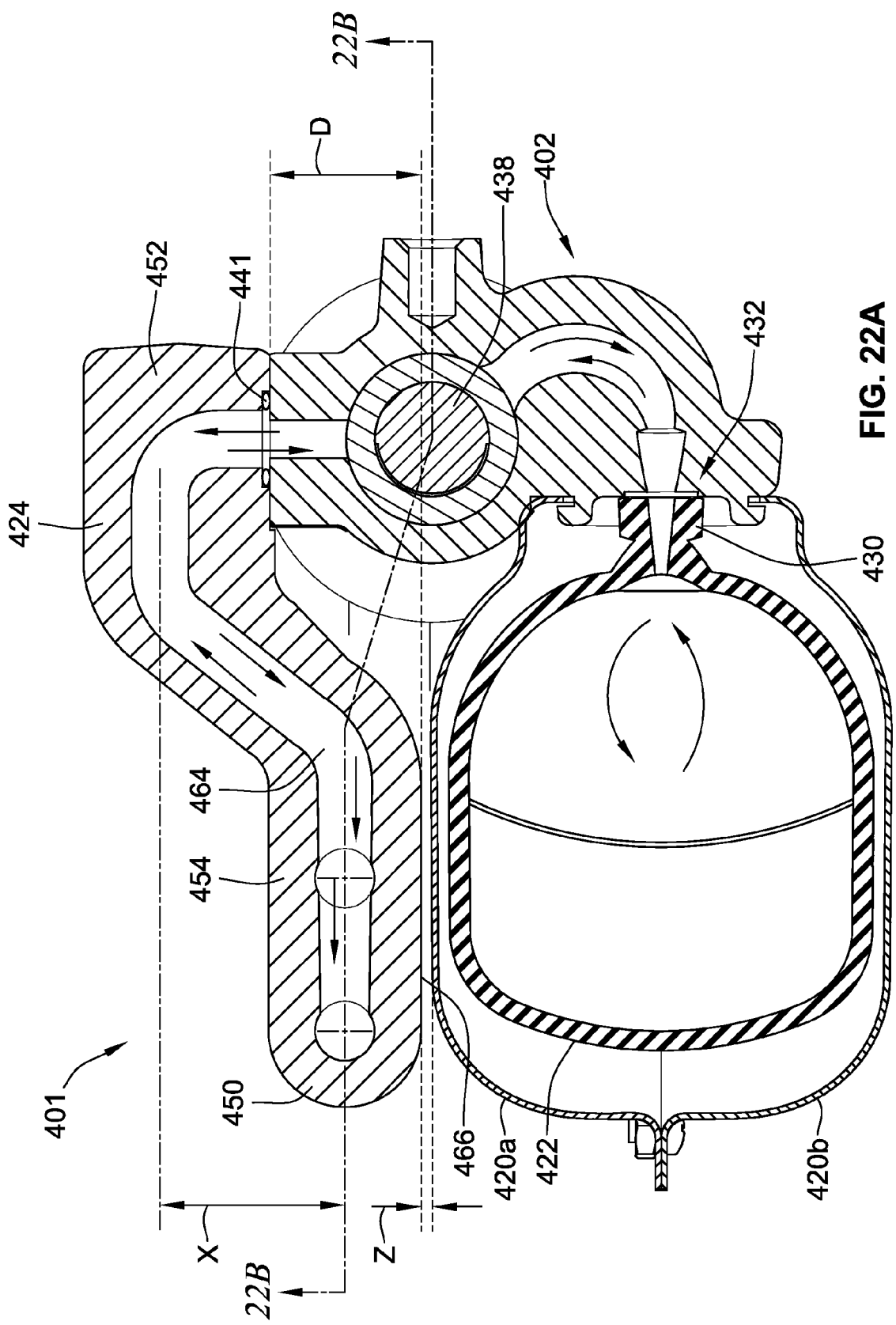
FIG. 22A is a top cross-sectional view of FIG. 20B.

The hydraulic hole 459 is internally connected to an inlet port 460 and an outlet port 462 via an internal channel 464 (illustrated in FIG. 22A). The inlet port 460 is adapted to receive the inlet hose-end 446, to which the inlet hose 426 is coupled, and the outlet port 462 is adapted to receive the outlet hose-end 446, to which the outlet hose 428 is coupled. The inlet and outlet ports 460, 462 are aligned with a central axis of the internal channel 464 and are oriented perpendicular to the orientation of the hydraulic hole 459. Additionally, the spacing between the inlet port 460 and the outlet port 462 facilitates parallel coupling of the two hose ends 446, 448 adjacent to each other.

Figure 22B:
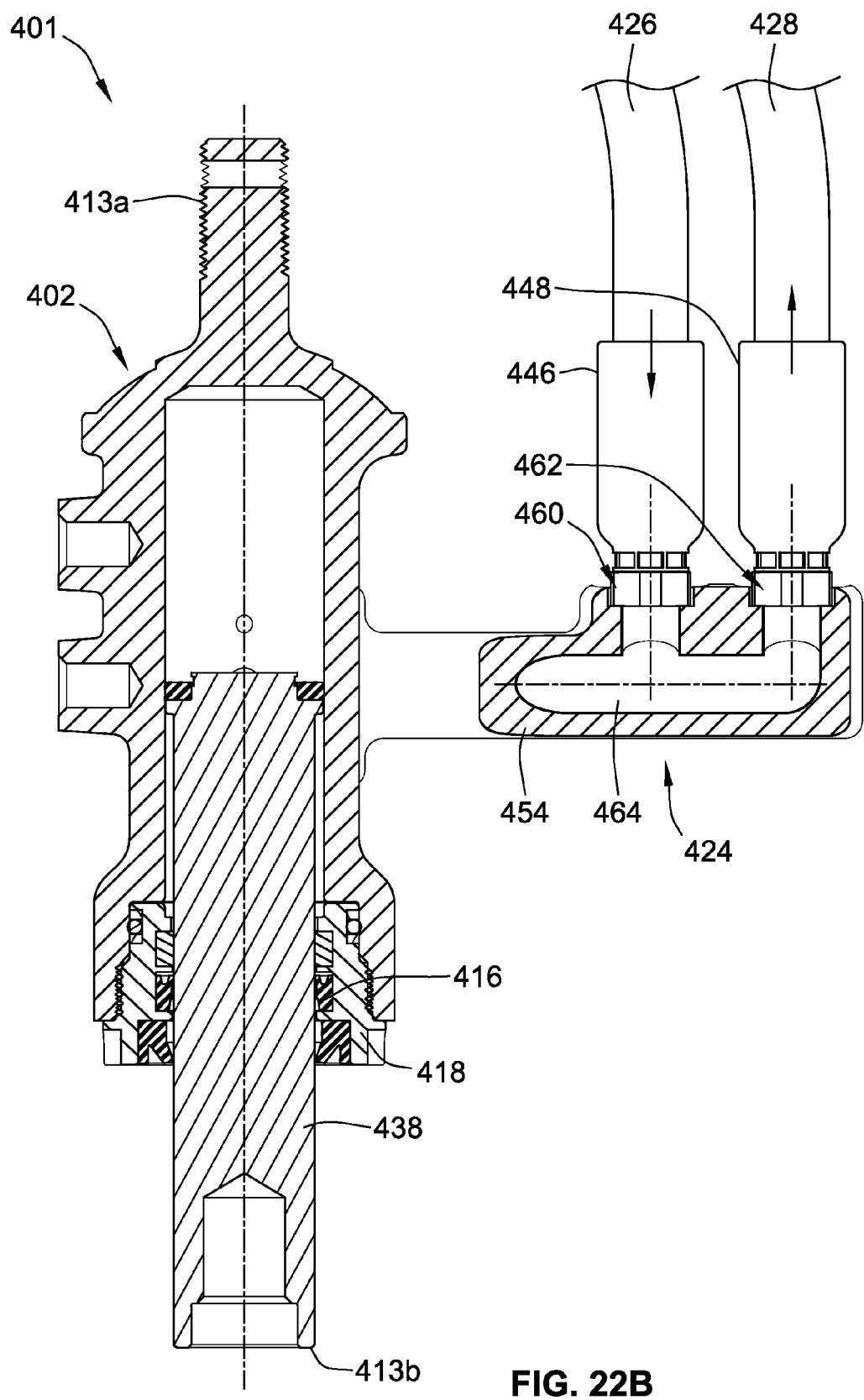
FIG. 22B is a side cross-sectional view of FIG. 20B.

Referring to FIGS. 22A and 22B, the configuration of the hydraulic assembly 401 facilitates delivery of hydraulic fluid to the hydraulic cylinder 402 in a relatively space-constrained environment while still providing easy access to main components, including the accumulator 422 and the hose connection manifold 424, for service and replacement. For example, referring specifically to FIG. 22A, hydraulic fluid circulates unrestricted between the hose connection manifold 424, the hydraulic cylinder 402, and the accumulator 422 via the internal channel 464. The geometric configuration of the hose connection manifold 424 facilitates mounting the accumulator protective cover 420 close to the distal end 450 of the hose connection manifold 424 at a relatively small distance Z, thus minimizing required mounting space, without causing interference between the hose connection manifold 424 and the accumulator protective cover 420.

In addition to the offset distance D, the distal end 450 is further defined by a distance X that separates two extreme points of a central axis of the internal channel 464. Specifically, distance X is defined by a point of the central axis near the distal end 450 and a point of the central axis near the mounting end 452. Although the offsetting of the two ends 450, 452 does not impact the flow of hydraulic fluid, the offsetting helps increase clearance space between the hose connection manifold 424 and the linkage assembly 406.

Referring more specifically to FIG. 22B, the inlet hose 426 and the outlet hose 428 can be easily and quickly removed, in the field, based at least on their parallel upward attachment to the hose connection manifold 424. Optionally, the inlet hose 426 and the outlet hose 428 can be daisy chained when using a typical side-by-side arrangement of row units. For example, in one illustrative example, a first row unit is connected directly to the hydraulic source via its inlet hose and directly to the inlet port of an adjacent second row unit via its outlet hose. Thus, the second row unit receives hydraulic fluid, indirectly, from the hydraulic source via the first row unit. The second row unit, is further daisy chained to an adjacent third row unit such that the outlet hose of the second row unit is directly connected to the inlet port of the third row unit. This type of daisy-chain configuration can continue with dozens of row units. To change the configuration to a standard hose routing, one of the two ports 460, 462 is plugged and a tee is placed in front of the row unit such that a single hose is connected to the hydraulic cylinder 402.

Figure 23:
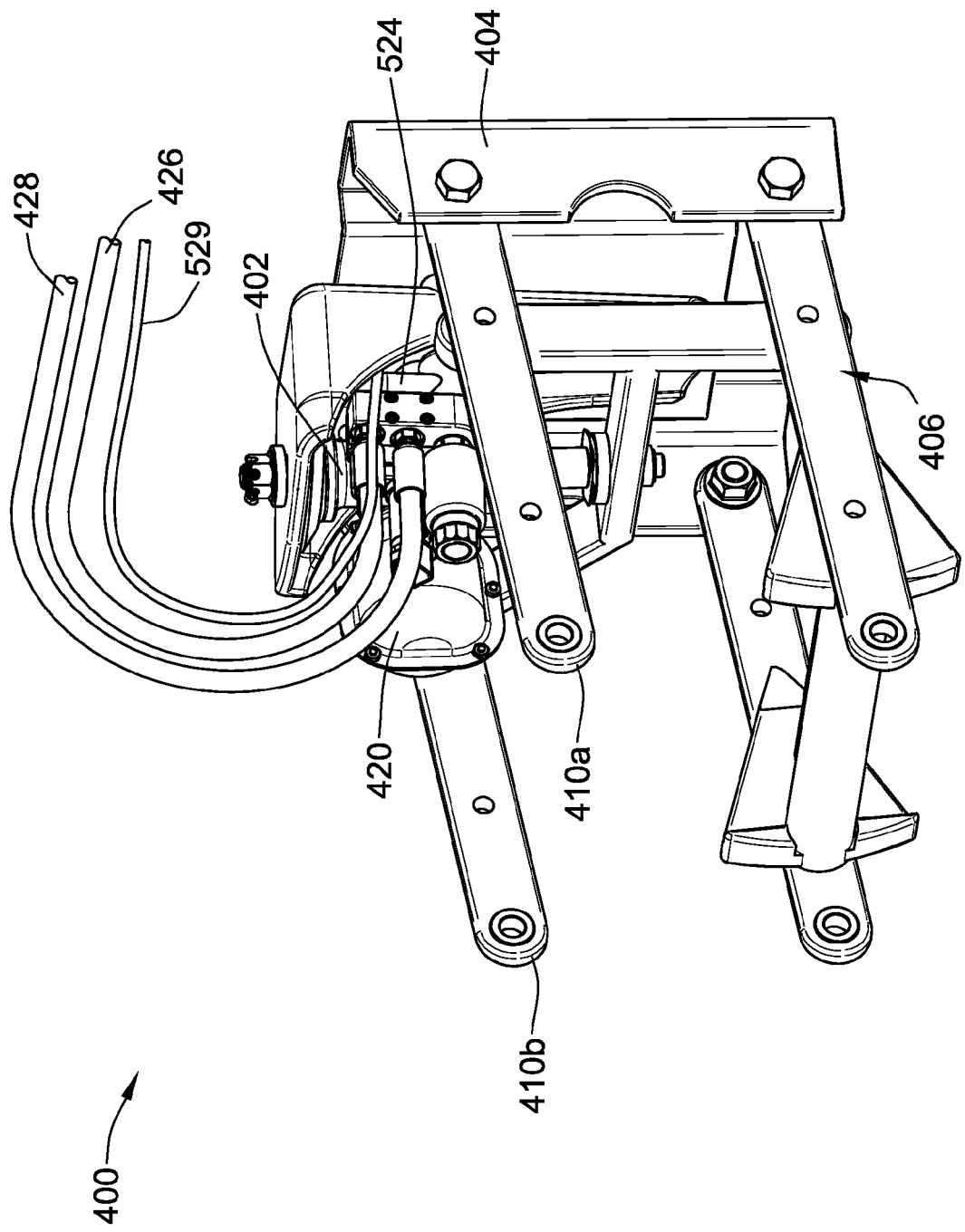
FIG. 23 is a perspective view of an alternative configuration of the hydraulic system of FIG. 19.
Figure 24A:
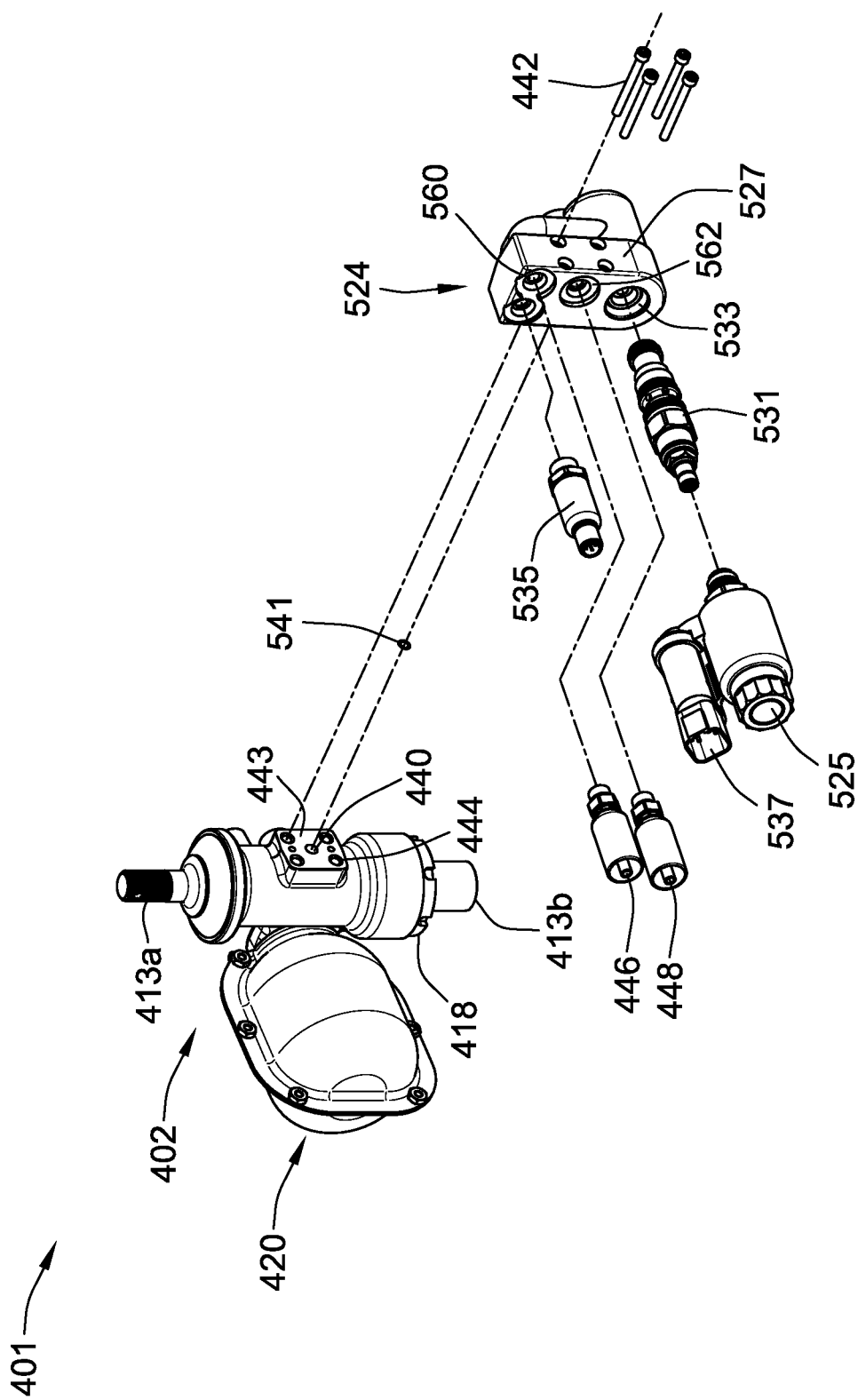
FIG. 24A is an exploded view of an alternative configuration of a hydraulic assembly.
Figure 24B:
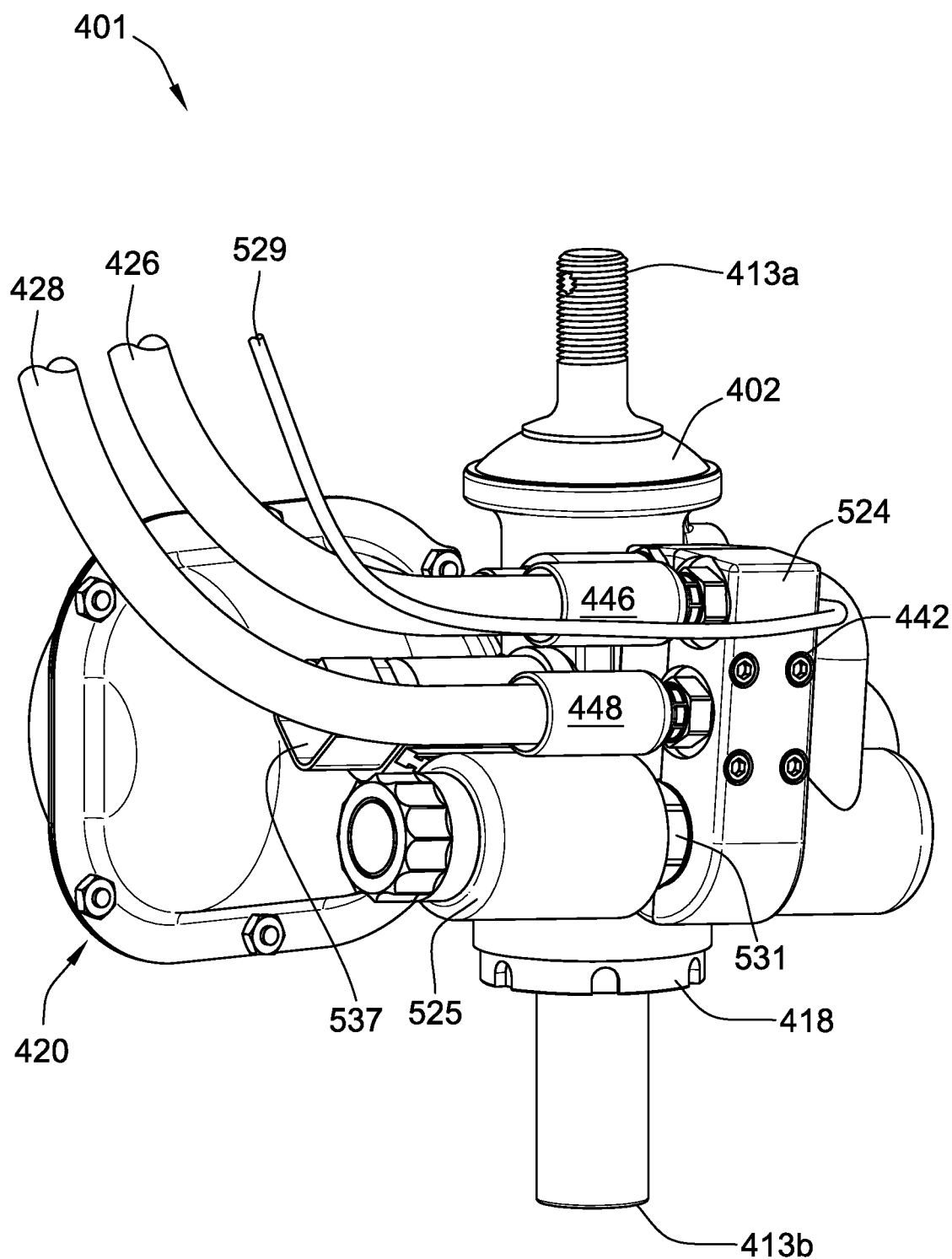
FIG. 24B is an assembled perspective view of FIG. 24A.

Referring to FIG. 23, in an alternative configuration of the hydraulic system 400 the hose connection manifold 424 has been replaced with the integrated control manifold 524 that includes both an electronic control module 525 and a connection manifold 527 (both shown in FIGS. 24A and 24B). The control manifold 524 is configured to fit within the upper links 410a, 410b next to the accumulator protective cover 420, similar to the hose connection manifold 424. Thus, similarly to the hose connection manifold 424, the control manifold 524 does not interfere with any components of the hydraulic system 400. Additionally, easy access is provided for a user to couple/uncouple the inlet and outlet hoses 426, 428 to/from the control manifold 524. The control manifold 524 is further connected to a control signal wire 529 for receiving control signals from a central processing unit.

One benefit of the control manifold 524 is that each row unit of a plurality of adjacent row units (in a side-by-side arrangement of row units) has its own pressure control valve. Assuming that the control manifold 524 is mounted in each of the plurality of row units, the down pressure in each row unit can be individually controlled. To achieve individual control, both the inlet hose 426 and the outlet hose 428 of each row unit are connected to the hydraulic source in parallel. For example, the inlet hose of a first row unit is connected to the tractor for supplying constant pressure to the first row unit, and the outlet hose of the first row unit is also connected to the tractor for returning hydraulic fluid from the first row unit. Similarly, the inlet hose of a second row unit is connected to the tractor for supplying constant pressure to the second row unit, and the outlet hose of the second row unit is also connected to the tractor for returning hydraulic fluid from the second row unit. According to this example, the pressure in the first and second row units can be independently controlled.

Referring to FIGS. 24A-24B, the control manifold 524 is mounted to the hydraulic cylinder 402 using the same long bolts 442, which are fastened to the threaded holes 444. The control manifold 524 has a mating face 556 (shown in FIGS. 25A-25C) that is generally similar (if not identical) to the mating face 456 of the hose connection manifold 424. The mating face 556 is configured as a mating face for facilitating attachment of the control module 524 to the mounting interface 440 (similar to the attachment of the hose connection manifold 424 to the mounting interface 440). An O-ring seal 541 is positioned between the control manifold 524 and the hydraulic cylinder 402 to prevent leakage of hydraulic fluid.

The hose ends 446, 448 are received in respective inlet and outlet ports 560, 562 for facilitating coupling of the hoses 426, 428 to the control module 542. In contrast to the inlet and outlet ports 460, 462 of the hose connection manifold 424, the inlet and outlet ports 560, 562 of the control manifold 524 are oriented perpendicular to (not parallel to) the central axis of the hydraulic cylinder 402. Nevertheless, a user can still reach with relative ease the connection between hoses 426, 428 and the ports 560, 562 for service-related needs.

The control module 525 includes a hydraulic valve cartridge 531 for reducing and/or relieving pressure in hydraulic cylinder 402. The valve cartridge 531 is enclosed within the control module 525 and has one end inserted in a cartridge port 533 of the connection manifold 527. In response to receiving a control signal, via the control signal wire 529 and the electrical connector 537, the valve cartridge 531 reduces pressure in the hydraulic cylinder 402 and, optionally, acts as a relief valve relieving any shocks or surges that may occur between the hydraulic source and the hydraulic cylinder 402. The control module 525 optionally includes a pressure transducer 535 and/or other embedded electronics.

For ease of access, an integrated electronic connector 537 of the control module 525 is positioned above the valve cartridge 531 for receiving electrical power via an electrical cable (not shown). The electronic connector 537 is angled towards the accumulator protective cover 420 to provide sufficient space for connecting all the required cables and hoses to the control module 525, e.g., the inlet and outlet hoses 426, 428, the control signal wire 529, and the electrical cable.

Referring to FIGS. 25A-25C, the connection manifold 527 is configured to facilitate the integral combination with the control module 525. For example, the connection manifold 527 has a mounting face 556 that is aligned, when mounted with the receiving face 443 of the mounting interface 440. The mounting face 556 of the connection manifold 527 is generally similar (if not identical) to the mounting face 456 of the hose connection manifold 424. For example, the mounting face 556 includes a plurality of mounting holes 558 arranged in a concentric pattern around a central hydraulic hole 559, through which hydraulic fluid is delivered to the hydraulic cylinder 402. The pattern of the mounting holes 558 matches a pattern of the threaded holes 444 of the mounting interface 440. When the connection manifold 527 is mounted to the hydraulic cylinder 402, the long bolts 442 are received through the mounting holes 558.

The hydraulic hole 559 is internally connected to the inlet port 560, the outlet port 562, the cartridge port 533, and a transducer port 539. In contrast to the hose connection manifold 424, the connection manifold 527 includes the additional cartridge port 533 for coupling to the valve cartridge 531 (which controls output of fluid pressure from the hydraulic cylinder 402) and the transducer port 539 for coupling to the pressure transducer 535. The ports are positioned along a control face 541, which is generally perpendicular to the mounting face 556. Thus, although the connection manifold 527 and the hose connection manifold 424 share some similarities (e.g., sharing the modular mounting interface 440), they are different in type at least based on the connection manifold 527 being configured geometrically to facilitate the integration with the control module 525.

Referring generally to FIGS. 26-27B, a hydraulic cylinder 619 and energy storage device 627 are generally similar to the hydraulic cylinder 19 and accumulator 27 described and illustrated above in reference to FIGS. 5 and 6. Referring specifically to FIG. 27A, a single unitary housing 623 forms a cavity 624 in which the hydraulic cylinder 619 and the energy storage device 627 are enclosed, at least in part. The hydraulic cylinder 619 contains a ram 625 that advances towards a housing port 622 or retracts towards a stem 660.

Referring specifically to FIG. 27B, the ram 625 has a leading edge 650 near which a wear ring 652 is mounted. The wear ring 652 is mounted on the ram 625 concentric with a central axis Z of the ram 625 and in physical contact (or close to being in physical contact) with a cylinder wall 654. The wear ring 652 can be a seal or some other component that can provide a barrier zone between the ram 625 and the cylinder wall 654. The wear ring 652 can have a cylindrical cross-sectional profile (as illustrated in FIG. 27B) or any other cross-sectional profile.

The wear ring 652 guides the ram 625 within the cylinder wall 654 of the hydraulic cylinder 619, absorbing transverse forces. The wear ring 652 further prevents (or reduces) metal-to-metal contact between the ram 625 and the cylinder wall 654 and, thus, optimizes the performance of the hydraulic cylinder 619. As such, one benefit of the wear ring 652 is that it prevents or reduces wear of the ram 625 due to frictional contact with the cylinder wall 654. Another benefit of the wear ring 652 is that it tends to act as a seal component (although not necessarily specifically intended to be a seal component). For example, especially during high-speed movement of the ram 625, tight tolerances between the ram 625 and the cylinder wall 654 help achieve a sealing function that prevents, or greatly reduces, undesired fluid flow between the ram 625 and the cylinder wall 654. According to one example, the tight tolerances can range between 0.01 inches and 0.03 inches.

The ram 625 further includes a plurality of intersecting internal passageways, including an axial passageway 660 and a radial passageway 662. The axial passageway 660 starts at the leading edge 650 and continues partially within the ram 624, along the central axis Z, until it intersects with the radial passageway 662. The radial passageway 662 extends perpendicular to the central axis Z between the central axis Z and a peripheral wall of the ram 625.

Similar to a shock absorber, the internal passageways 660, 662 provide a dampening feature to the hydraulic cylinder 610. Specifically, the internal passageways 660, 662 equalize pressure on either side of the wear ring 652 (which tends to act as a seal at high-speed ram velocities). While the hydraulic cylinder 619 is intended to generate pressure, the internal passageways 660, 662 integrate into the hydraulic cylinder 619 damping to control unwanted movement and or pressure. As such, the internal passageway 660, 662 are helpful in preventing damage to the hydraulic cylinder 619 by controlling the damping of the hydraulic cylinder 619. Optionally, in addition to acting as orifices for controlling damping, the internal passageways 660, 662 can be used for mounting check valves to the ram 625. The check valves can further control the damping in the hydraulic cylinder 619. Accordingly, the internal passageways 660, 662 provide a hydraulic cylinder with an integrated damping-control system.

Referring to FIGS. 28A and 28B, a planting row unit 710 is generally similar to the planting row unit 10 described above. The planting row unit 710 includes a V-opener 711, a row unit frame 712, a pair of closing wheels 716, and a gauge wheel 717 that are assembled and function similarly to the similarly numbered components of the planting row unit 10. The planting row unit 710 also includes a hydraulic cylinder 700 that urges the closing wheels 716 downwardly with a controllable force that can be adjusted for different conditions.

The hydraulic cylinder 700 includes a double-acting ram 705 (which further exemplifies the double-acting ram embodiment identified above in reference to the ram 25) that can move in opposing directions based on fluid pressure received from either a first hose 701a or a second hose 701b. As such, hydraulic fluid is received via the hoses 701a, 701b to act alternately on both sides of the double-acting ram 705 and, consequently, apply alternate pressure in both directions of arrows A-A'. The hydraulic cylinder 700 can, optionally, further includes a biasing element 720 (e.g., mechanical spring, compressed coil spring, pressurized gas) to further add pressure in addition to the pressure provided by the double-acting ram 705. The biasing element 720 can be added on either side of the double-acting ram 705.

One benefit of the double-acting ram 705 is that it can provide both down pressure or up pressure, as needed, for the planting row unit 710. For example, if additional pressure is required to cause the V-opener 711 to penetrate the soil to a required depth, down pressure would be applied. If, for example, the planting row unit 710 is too heavy and the V-opener 711 penetrates the soil in excess of the required depth, then up pressure would be applied (without requiring an additional hydraulic cylinder).

Figure 29:
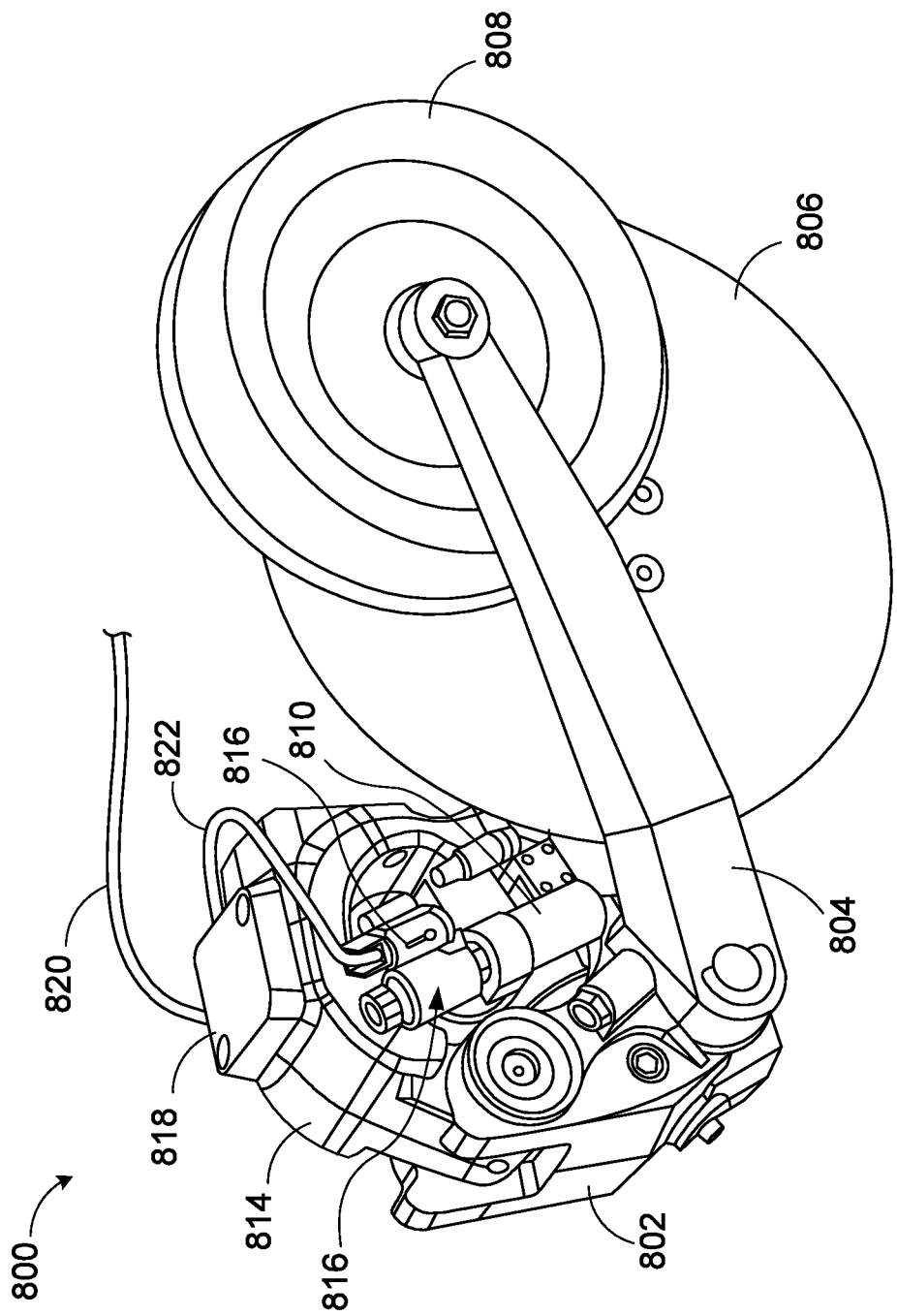
FIG. 29 is a perspective view of an agricultural opener device with integrated controller.

Referring to FIG. 29, a disk opener 800 is adapted for attachment to a row unit, such as planting row unit 10 described above in reference to FIG. 1. The disk opener 800 includes a support 802 to which a swing arm 804 is mounted for attaching a disk 806 and a gauge wheel 808. The disk 806 penetrates the soil to a planting depth for forming a furrow or seed slot, as the row unit is advanced by a tractor or other towing vehicle. The gauge wheel 808 determines the planting depth for seeds and/or height of introduction of fertilizer.

The disk opener 800 further includes a down-pressure cylinder 810, with an integrated control valve 812, that is mounted to a bracket 814. The down-pressure cylinder 810 is generally similar to the hydraulic cylinder 402 (e.g., illustrated in FIG. 19) and the integrated control valve 812 is generally similar to the control module 525 (e.g., illustrated in FIG. 24A). The control valve 812 includes a solenoid 816 that is generally similar to the electronic connector 537 (e.g., illustrated in FIG. 24A).

In addition, the disk opener 800 includes a programmable-logic controller (PLC) or other computer control unit 818 that is also mounted to the bracket 814. Optionally, the control unit 818 is directly integrated into the control valve 812, e.g., into the solenoid 816. According to this optional embodiment, the control unit 818 would be generally similar to the embedded electronics integrated with and described above in reference to the control module 525. The control unit 818 is coupled to a power supply via a control wire 820 and to the control valve 812 via a valve wire 822. The control wire 820 optionally functions to connect the control unit 818 with a control interface such as found in a tractor.

An advantage of mounting the control unit 818 to the row unit, via the disk opener 800, is that it provides better, and specific, control over the control valve 812. As such, for example, each row unit in an arrangement having a plurality of side-by-side row units (such as illustrated below in FIG. 30) can be individually controlled to apply a desired down pressure specific to the corresponding row unit. Thus, the control unit 818 runs a control algorithm that takes inputs and determines an output signal for the control valve 812.

Figure 30:
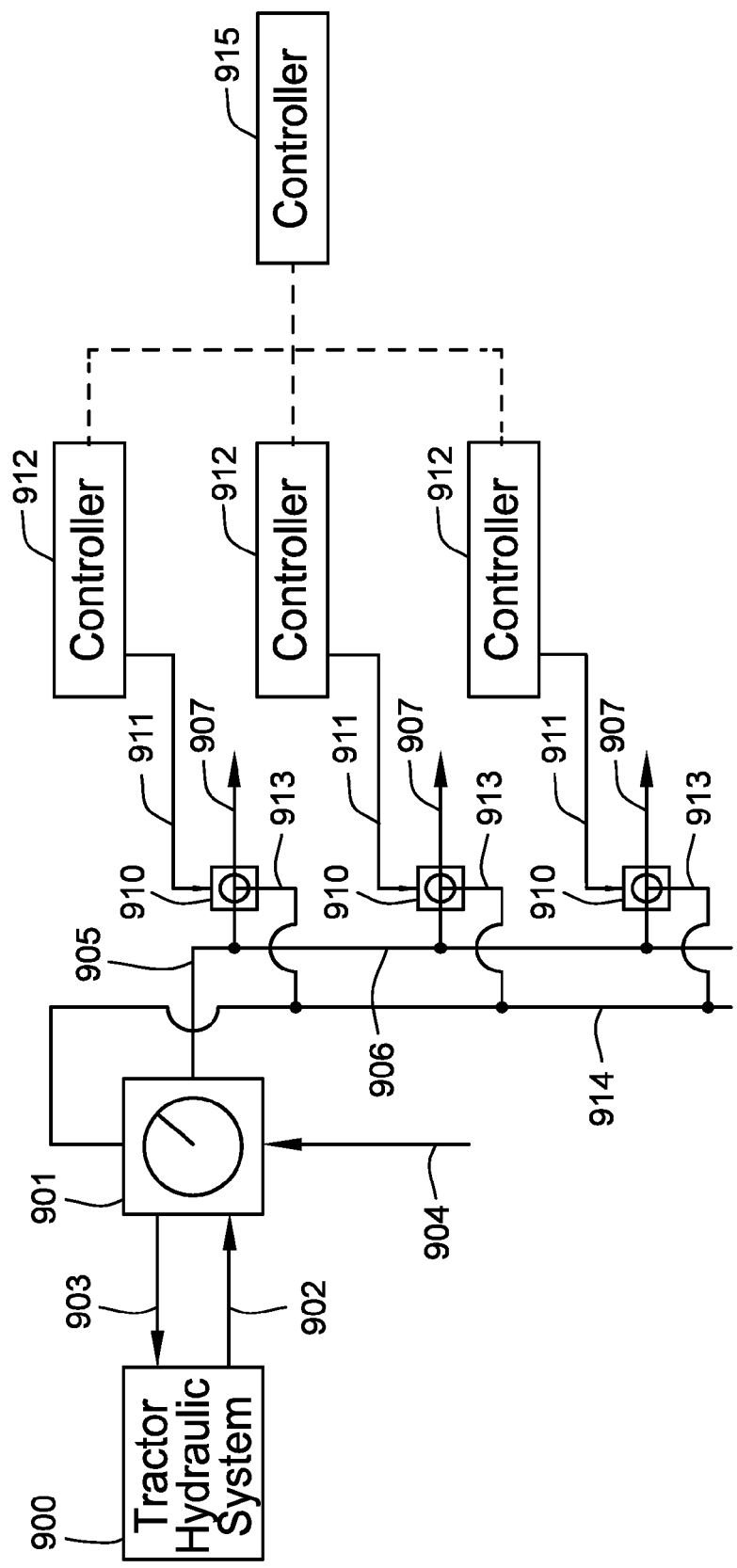
FIG. 30 is a schematic diagram of a hydraulic control system having integrated controllers in one or more row units.

Referring to FIG. 30, a hydraulic control system supplies pressurized hydraulic fluid to cylinders of multiple row units. A source 900 of pressurized hydraulic fluid, typically located on a tractor, supplies hydraulic fluid under pressure to an optional main valve 901 via a supply line 902 and receives returned fluid through a return line 903. The main valve 901 can be set by an electrical control signal S1 on line 904 to deliver hydraulic fluid to an output line 905 at a desired constant pressure. The output line 905 is connected to a manifold 906 that, in turn, delivers the pressurized hydraulic fluid to individual feed lines 907 (which are connected to ports of respective hydraulic cylinders of the individual row units). Optionally, the main valve 901 is turned off after all cylinders have been filled with pressurized hydraulic fluid to maintain a fixed volume of fluid in each cylinder.

Each of the individual feed lines 907 leads to one of the row units and is provided with a separate control valve 910 that receives its own separate control signal on a line 911 from a respective controller 912 (which is integrated in the respective row unit as described above in reference to FIGS. 24A and 30). The separate control valve 910 is provided in addition to or instead of the valve 901. This arrangement permits the supply of pressurized hydraulic fluid to each row unit to be turned off and on at different times by the separate control valve 910 for each row unit, with the times being controlled by the separate control signals supplied to the valves 910 by the respective controllers 912. The individual valves 910 receive pressurized hydraulic fluid via the manifold 906, and return hydraulic fluid to the tractor via separate return lines 913 connected to a return manifold 914, which is connected back to the hydraulic system 900 of the tractor. Optionally, one or more of the individual integrated controllers 912 are connected to a main controller 915 that provides control input for at least one of the integrated controllers 912.

Figure 31:
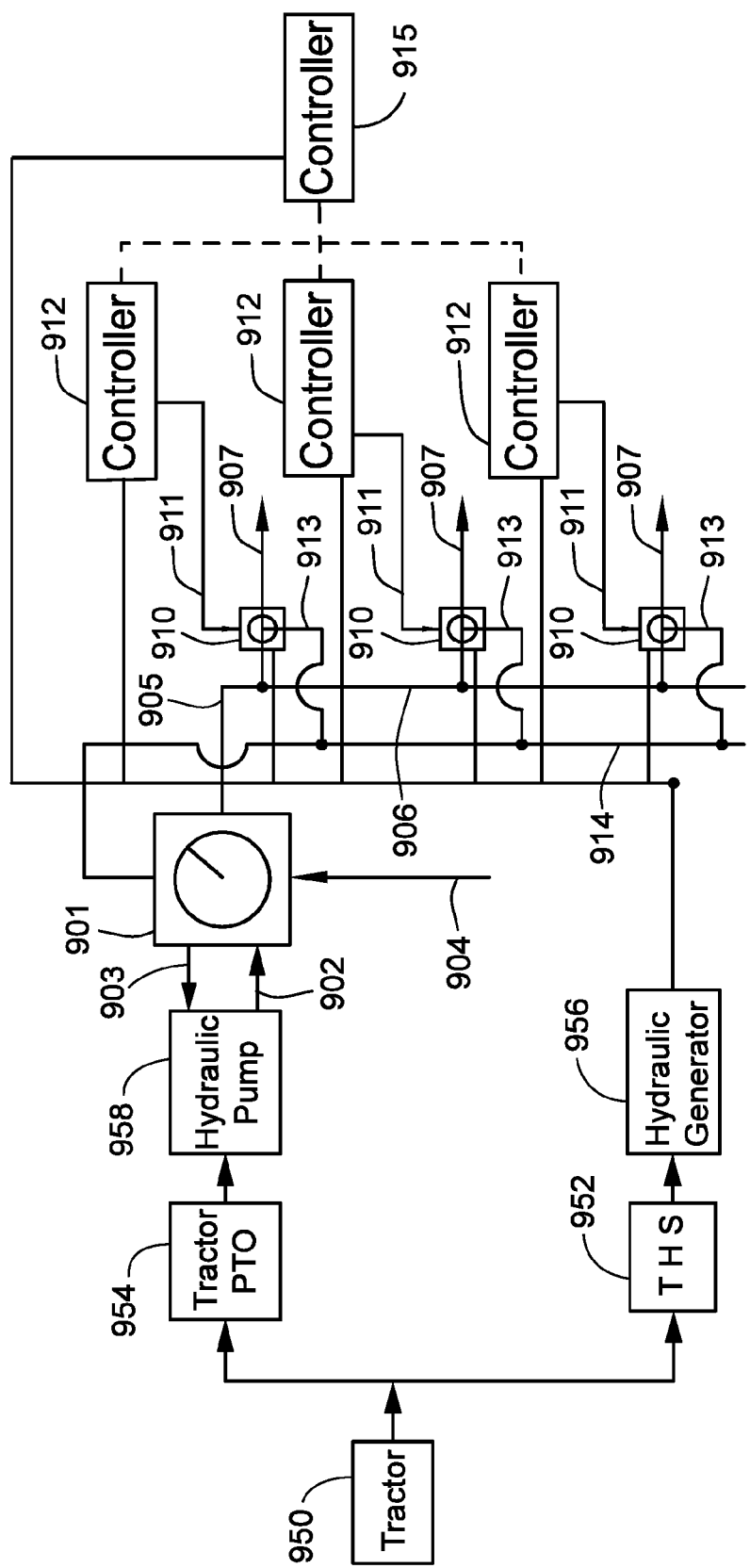
FIG. 31 is a schematic diagram of a hydraulic control system for use with a row unit.

Referring to FIG. 31, an alternative configuration is illustrated in reference to the hydraulic control system described above in FIG. 30. The alternative configuration includes a tractor 950 that generates hydraulic auxiliary power bifurcated into two power subsets: a tractor hydraulic system (THS) 952 and a tractor power take-off (PTO) 954. The tractor hydraulic system 952 is coupled to a hydraulically-driven electrical generator 956 for generating electricity for row unit components such as the control valves 910 and/or other control modules (e.g., controllers 912, 915). The tractor PTO 954 is mechanical power that runs a hydraulic pump 958 to provide mechanical power for row unit components such as hydraulic cylinders connected to the individual feed lines 907.

Providing both the hydraulic system 952 and the tractor PTO 954 helps provide additional electrical power for electrical components that previously were not included in an agricultural system. For example, adding controllers 912, 915 and control valves 910 to each row unit results in an increased need of electrical power relative to agricultural systems that, for example, lacked individual row-unit control. The electrical generator 956 compensates for and provides the required increased electricity.

Figure 32:
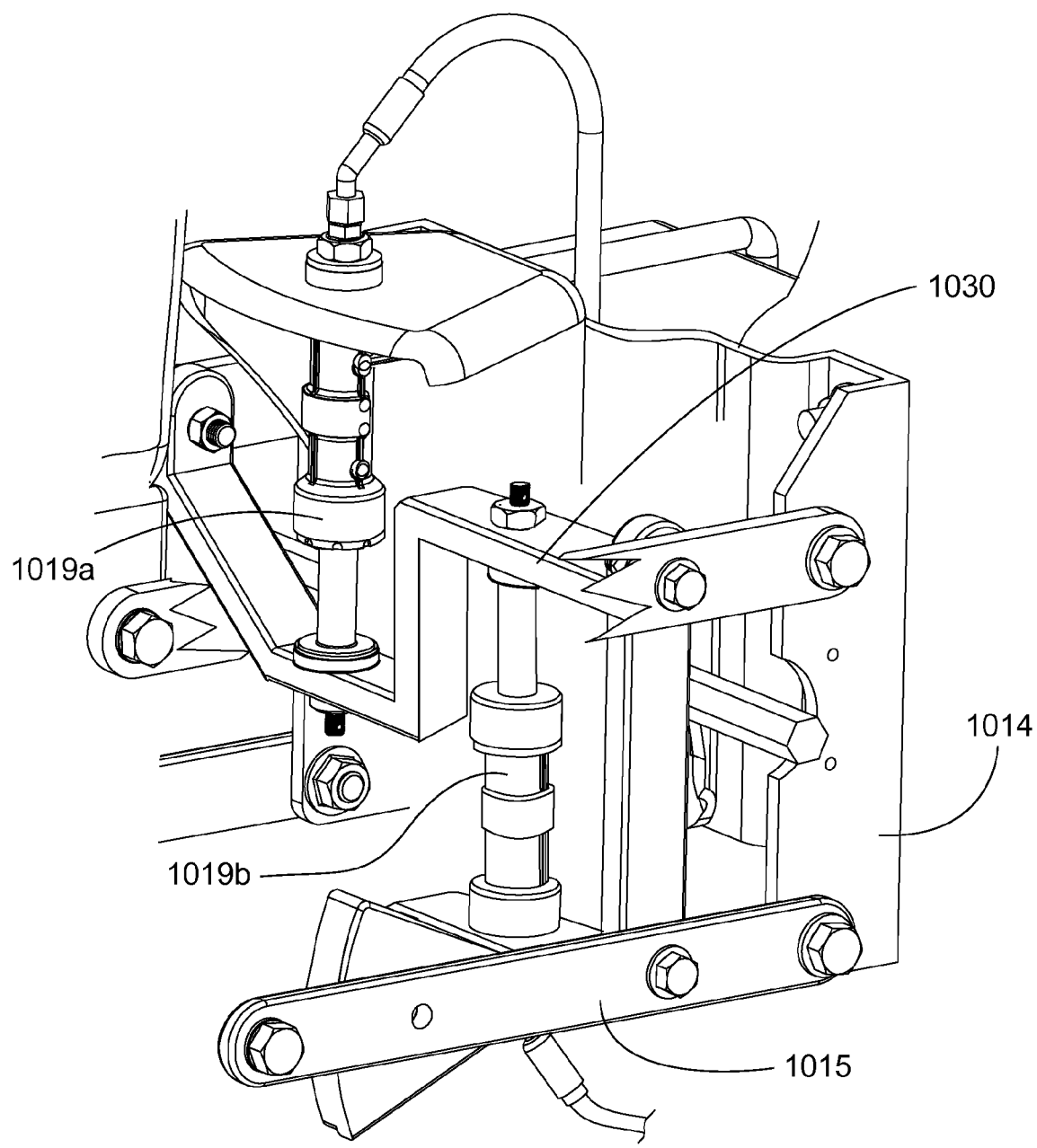
FIG. 32 is a partial perspective view of a linkage assembly with two actuators for controlling a row unit.
Figure 33:
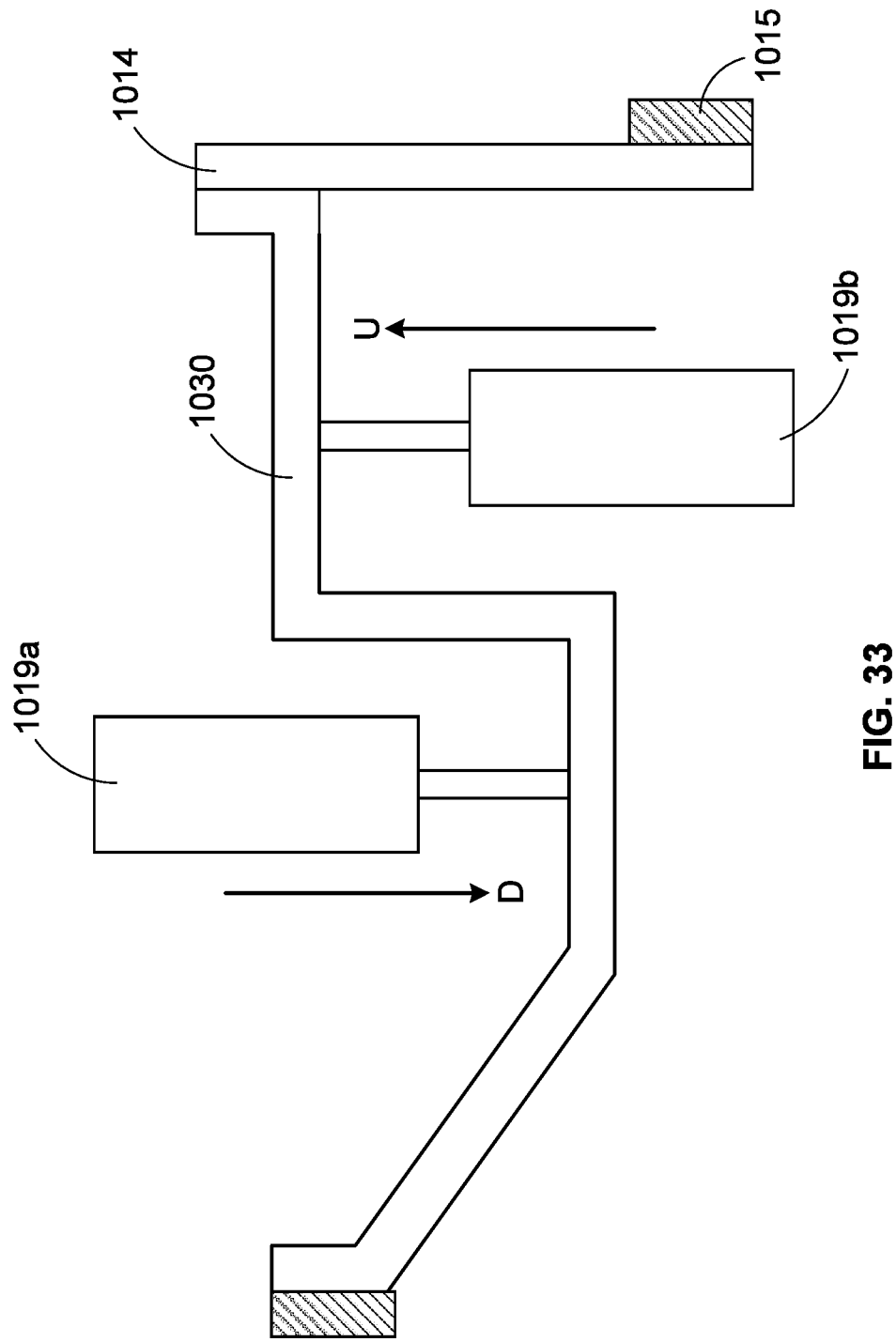
FIG. 33 is a side illustration of the linkage assembly of FIG. 32.

Referring to FIGS. 32 and 33, a hydraulic cylinder system includes two hydraulic cylinders 1019a, 1019b, instead of a single actuator as described above in reference to the hydraulic cylinder 19 (which is illustrated, for example, in FIG. 9). Each of the hydraulic cylinders 1019a, 1019b is generally similar to the hydraulic cylinder 19. However, instead of coupling the single hydraulic cylinder 19 between a front frame and a linkage assembly, this alternative embodiment illustrates coupling the two hydraulic cylinders 1019a, 1019b between a front frame 1014 and a linkage assembly 1015.

The hydraulic cylinders 1019a, 1019b are both mounted at one end to a cross bar 1030, which has been modified in this illustrative embodiment and relative to the cross bar 30 of FIG. 9 to have generally a Z-shape. Specifically, a first hydraulic cylinder 1019a is mounted such that it can apply down pressure D to the row unit and a second hydraulic cylinder 1019b is mounted such that it can apply up pressure U to the row unit.

One advantage of having two cylinders 1019a, 1019b is that the row unit can be controlled both up and down with more precision. For example, the controlled row unit may have a heavy weight that results in a furrow depth exceeding the desired planting depth. To counter the weight, the second hydraulic cylinder 1019b is used to raise the row unit such that the shallower depth is achieved. As such, the second hydraulic cylinder 1019b acts to subtract (or counter) at least some of the row-unit weight. If the row unit has a light weight that results in a shallower depth than desired, the first hydraulic cylinder 1019a is used to lower the row unit such that the deeper depth is achieved. As such, the first hydraulic cylinder 1019a acts to artificially add weight to the row unit.

Figure 34:
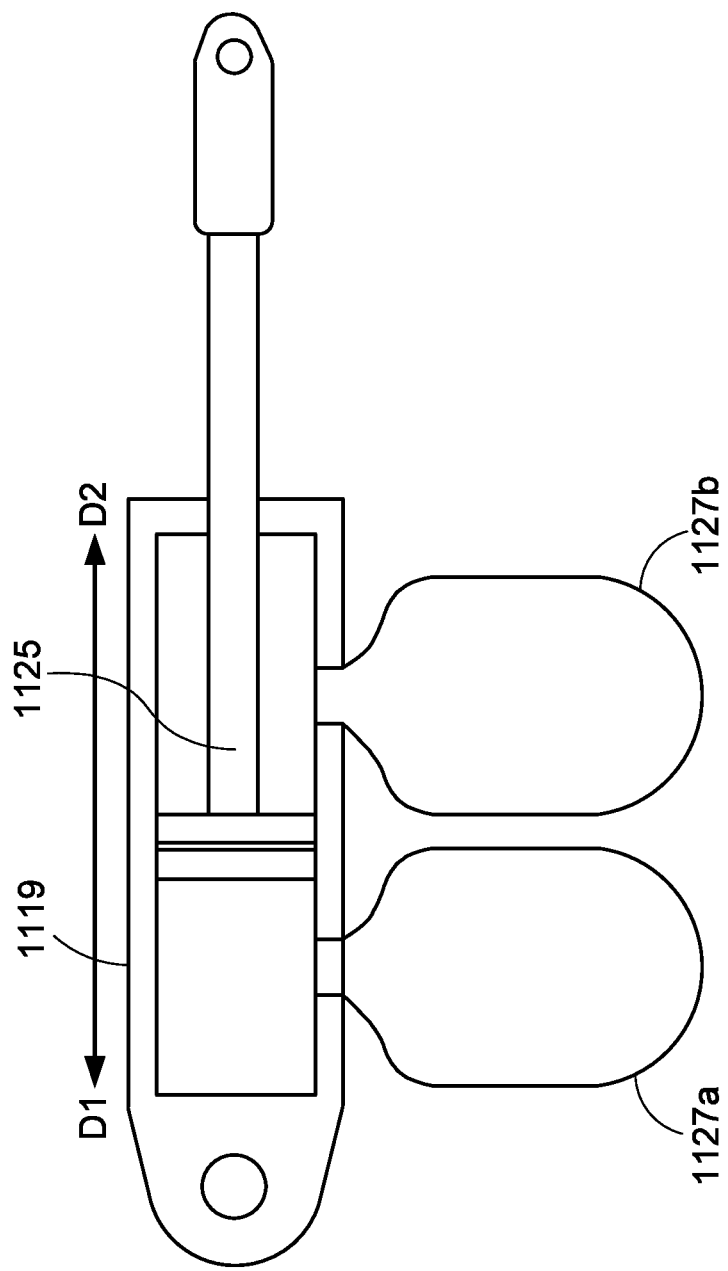
FIG. 34 illustrates an actuator having two energy storage devices.

Referring to FIG. 34, a hydraulic cylinder 1119 includes two storage energy devices, which are illustrated in the form of a first accumulator 1127a and a second accumulator 1127b. Each of the two accumulators 1127a, 1127b is generally similar to the accumulator 27 (illustrated, for example, in FIG. 6). The hydraulic cylinder 1119 includes a ram 1125 that acts similar to the double-acting ram 705 illustrated in FIGS. 28A and 28B. The ram 1125 can provide both down pressure or up pressure, as needed, for a planting row unit (e.g., planting row unit 710). The accumulators 1127a, 1127b act as shock absorbers to help relieve pressure based on the direction of the applied pressure by the double-acting ram 1125. For example, the first accumulator 1127a relieves pressure when the double-acting ram 1125 applies pressure in a first direction D1 (e.g., down pressure), and the second accumulator 1127b relieves pressure when the double-acting ram 1125 applies pressure in a second direction D2 (e.g., up pressure).

The use of this hydraulic cylinder 1119, as a compact hydraulic down-force unit with integral accumulators 1127a, 1127b on each row unit, provides the advantages of quick response and remote adjustability of a hydraulic down-force and up-force control system. If an obstruction requires quick movement, oil can flow quickly and freely between the force cylinder 1119 and the respective adjacent accumulator 1127a, 1127b, without exerting force on other actuators in the system.

Figure 35:
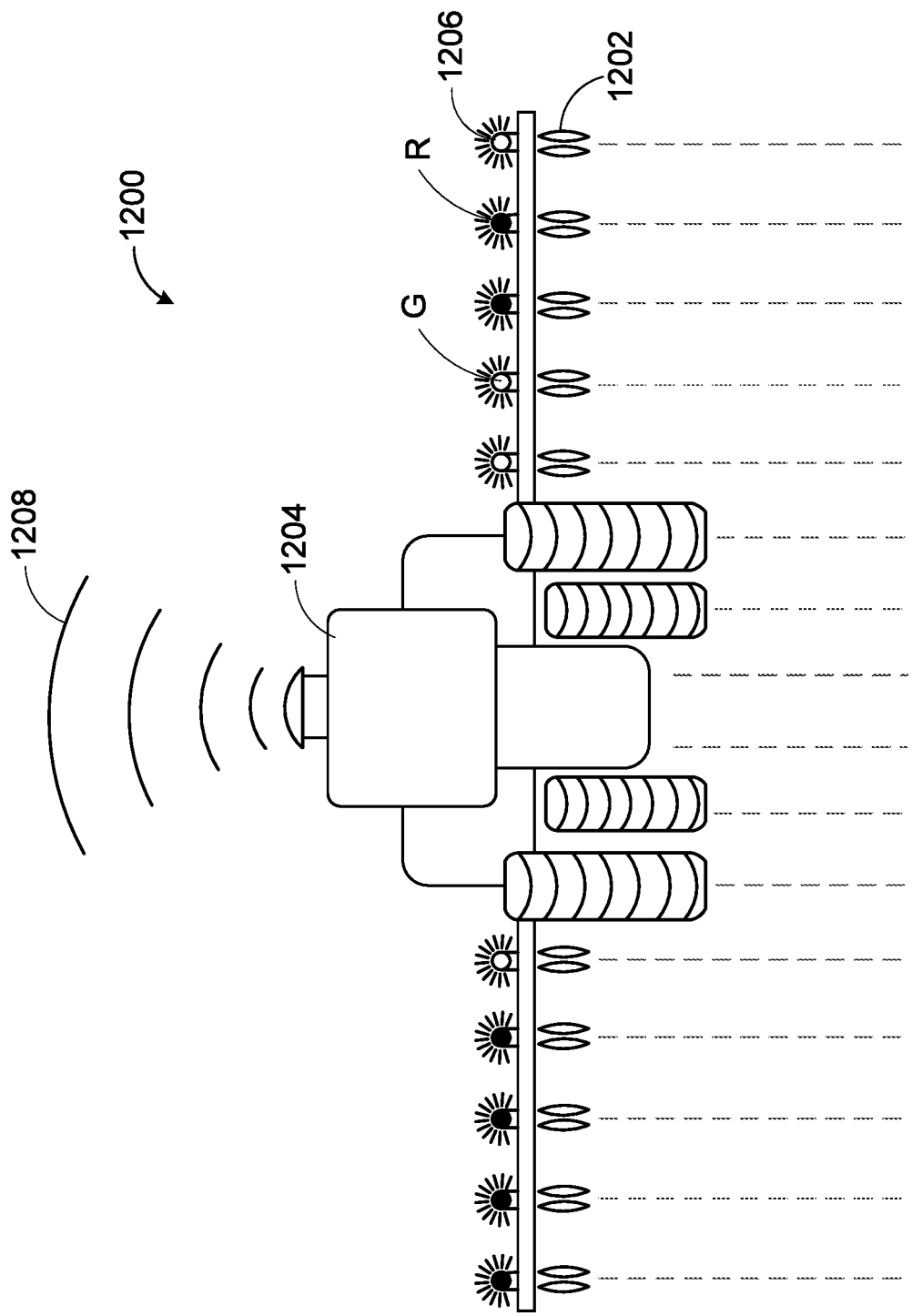
FIG. 35 illustrates a tractor towing a plurality of row units having status indicators.

Referring to FIG. 35, a controllable hydraulic control system 1200 includes a plurality of row units 1202 that are towed by a vehicle 1204 through a field. Each of the row units 1202 includes a status indicator 1206 for signaling performance-related issues. According to one example, the status indicators 1206 are light-emitting diodes (LED) that provide a easily discernable way to visually inspect the performance of the row units 1202. For example, the LED status indicators 1206 can flash a red color R to indicate improper tilling or a malfunction. If everything performs as intended, the status indicators 1206 can flash a green color G.

The status indicator 1206 can be a single (larger) LED or a plurality of LEDs of various sizes. Alternatively, the status indicator 1206 can include in addition to or instead of the LED an audible indicator to signal a malfunction or other condition of the system 1200.

Optionally, the status indicators 1206 can be integrated with control electronics of the row units 1202 (e.g., control module 525 illustrated in FIG. 23) and can provide a status-check of the electronics. Thus, the status indicators 1206 are attached to each individual row unit 1202 to provide a person that is far away from the row units 1202 a quick visual check on the performance status of the system 1200, including the performance status of an electronics controller.

In another example, the status indicators 1206 are particularly helpful in a system 1200 that is a human-less farming system. The human-less farming system is a system in which robotic machines are moving about in the field to perform tilling, planting, and/or other agricultural functions. Such a system is monitored by a farm manager that is standing, for example, a quarter-mile away from the system. The status indicators 1206 provide the farm manager with quick and easy visual signals that indicate the performance of the system.

Optionally, the system 1200 further emits a wireless signal 1208 for communicating status performance to an online monitoring system. The performance of the system 1200 can be, then, evaluated using an electronic device such as a smartphone.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural row unit comprising:
   an attachment frame adapted to be rigidly connected to a towing frame;
   a linkage assembly pivotably coupled to the attachment frame to permit vertical pivoting movement of the linkage assembly relative to the attachment frame;
   a hydraulic cylinder coupled to the linkage assembly for urging the linkage assembly downwardly toward the soil; and
   a hose connection manifold mounted adjacent to the hydraulic cylinder for circulating hydraulic fluid between a hydraulic source and the hydraulic cylinder, the hose connection manifold having a plurality of ports including an inlet port, an outlet port, and a valve port, the inlet port being adapted to receive an inlet hose, the outlet port being adapted to receive an outlet hose, the valve port being adapted to receive an end of a hydraulic control valve.

2. The agricultural row unit of claim 1, wherein the hydraulic control valve is a hydraulic cartridge valve attached to a control module.

3. The agricultural row unit of claim 2, wherein the control module includes one or more of a pressure transducer, embedded electronics, and an electronic connector.

4. The agricultural row unit of claim 1, wherein hydraulic control valve is removably connected to the hose connection manifold via the valve port.

5. The agricultural row unit of claim 1, wherein at least one of the plurality of ports is plugged.

6. The agricultural row unit of claim 1, further comprising an accumulator enclosed at least in part within a protective cover and mounted to the hydraulic cylinder, the protective cover having a central axis parallel to a central axis of the valve port.

7. The agricultural row unit of claim 6, wherein the central axis of the valve port is perpendicular to a central axis of the hydraulic cylinder.

8. The agricultural row unit of claim 1, wherein the inlet port receives a first end of the inlet hose, a second end of the inlet hose being connected to the hydraulic source.

9. The agricultural row unit of claim 1, wherein the inlet port receives a first end of the inlet hose, a second end of the inlet hose being connected to the hydraulic source, the outlet port receiving a first end of the outlet hose, a second end of the outlet hose being connected to an adjacent row unit.

10. An agricultural system, comprising:
    a hydraulic source for supplying pressurized hydraulic fluid;
    a towing frame attachable to a towing vehicle;
    a first row unit attached to the towing frame and including a
      a first hydraulic cylinder for urging the first row unit downwardly toward the soil, and
      a first hose connection manifold mounted adjacent the first hydraulic cylinder for circulating hydraulic fluid between the hydraulic source and the first hydraulic cylinder, the first hose connection manifold being a valve-less manifold; and
    a second row unit attached to the towing frame and including a
      a second hydraulic cylinder for urging the second row unit downwardly toward the soil, and
      a second hose connection manifold mounted adjacent the second hydraulic cylinder for circulating hydraulic fluid between the hydraulic source and the second hydraulic cylinder, the second hose connection manifold including a hydraulic control valve.

11. The agricultural system of claim 10, wherein at least one of the first hose connection manifold and the second hose connection manifold receives hydraulic fluid directly from the hydraulic source.

12. The agricultural system of claim 10, wherein at least one of the first hose connection manifold and the second hose connection manifold received hydraulic fluid indirectly from the hydraulic source, via a respective adjacent row unit.

13. The agricultural system of claim 10, wherein each of the first hose connection manifold and the second hose connection manifold has a plurality of ports including one or more of an inlet port, an outlet port, and a valve port.

14. The agricultural system of claim 13, wherein the hydraulic control valve has an end received within the valve port.

15. The agricultural system of claim 13, wherein the hydraulic control valve is removably received within the valve port.

16. The agricultural system of claim 13, wherein at least one of the plurality of ports is plugged.

17. The agricultural system of claim 10, wherein the hydraulic control valve is a hydraulic cartridge valve attached to a control module.

18. The agricultural system of claim 17, wherein the control module includes one or more of a pressure transducer, embedded electronics, and an electronic connector.

* * * * *